United States Patent [19]
Trefler

[11] Patent Number: 5,826,250
[45] Date of Patent: Oct. 20, 1998

[54] RULES BASES AND METHODS OF ACCESS THEREOF

[75] Inventor: Alan Trefler, Chestnut Hill, Mass.

[73] Assignee: Pegasystems Inc., Cambridge, Mass.

[21] Appl. No.: 666,165

[22] Filed: Jun. 19, 1996

[51] Int. Cl.$^6$ .................................................. G06F 17/30
[52] U.S. Cl. ............................... 706/50; 707/103; 707/2
[58] Field of Search .................................. 395/615, 614, 395/62, 54; 707/103, 101, 2

[56] References Cited

U.S. PATENT DOCUMENTS

| | | | |
|---|---|---|---|
| 4,930,071 | 5/1990 | Tou et al. | 395/54 |
| 5,136,523 | 8/1992 | Landers | 395/54 |
| 5,228,116 | 7/1993 | Harris et al. | 395/54 |
| 5,262,941 | 11/1993 | Saladin et al. | 705/38 |
| 5,267,175 | 11/1993 | Hooper | 364/489 |
| 5,276,885 | 1/1994 | Milnes et al. | 707/103 |
| 5,291,583 | 3/1994 | Bapat | 395/500 |
| 5,295,256 | 3/1994 | Bapat | 395/603 |
| 5,297,279 | 3/1994 | Bannon et al. | 395/500 |
| 5,379,366 | 1/1995 | Noyes | 395/54 |
| 5,446,885 | 8/1995 | Moore et al. | 395/54 |
| 5,473,732 | 12/1995 | Chang | 395/50 |
| 5,542,024 | 7/1996 | Balint et al. | 395/76 |
| 5,542,078 | 7/1996 | Martel et al. | 395/612 |
| 5,561,740 | 10/1996 | Barrett et al. | 395/62 |
| 5,596,752 | 1/1997 | Knudsen et al. | 395/701 |
| 5,627,979 | 5/1997 | Chang et al. | 395/613 |
| 5,630,127 | 5/1997 | Moore et al. | 395/615 |
| 5,649,192 | 7/1997 | Stucky | 707/103 |

OTHER PUBLICATIONS

F. Maryanski, et al., "The Data Model Compiler: A Tool for Generating Object–Oriented Database Systems," 1986 Int'l. Workshop on Object–Oriented Database Systems, pp. 73–84, Sep. 1986.

B. Thuraisingham, "From Rules to Frames and Frames to Rules," AI Expert, pp. 31–39, Oct. 1989.

W. Kim, "Object–Oriented Databases: Definition and Research Directions," IEEE Trans. on Knowledge and Data Engineering, vol. 2(3) pp. 327–341, Sep. 1990.

H.A. Kuno and E.A. Rundensteiner, "Augmented Inherited Multi–Index Structure for Maintenance of Materialized Path Query Views," Proc. Sixth Int'l. Workshop on Research Issues in Data Engineering, pp. 128–137, Feb. 1996.

(List continued on next page.)

*Primary Examiner*—Robert W. Downs
*Attorney, Agent, or Firm*—Choate, Hall & Stewart

[57] ABSTRACT

A rules base according to the invention comprises multiple entries encoded in a storage medium, e.g., optical disk, magnetic disk, or read-only memory or random access memory. Each entry is encoded to include, or is otherwise associated with, an objective and with a circumstance. Each entry is also marked to reflect its respective status, e.g., via status fields encoded in the records. These statuses include, inter alia, "valid," reflecting that information encoded in, or otherwise associated with, the entry corresponds to a rule for corresponding objective/circumstance; "inheritance," reflecting that the rule for the corresponding objective/ circumstance is to be sought elsewhere, e.g., in another entry in the rules base; and "invalid," reflecting that the corresponding combination of objective and circumstance is invalid. The rules base also includes an "inheritance" structure that, too, is encoded in a storage medium. A method for determining a rule for a designated objective and circumstance responds to identification, e.g., via a search of the rules base, of a valid entry that is associated with the designated objective/circumstance for generating a rule based on information associated with that entry. The method also responds to (i) the identification of an entry that is marked for inheritance and is associated that objective/ circumstance, or (ii) the failure to identify an entry associated with that objective/circumstance, for generating a rule based on information associated with another an entry in the rules base—particularly, an entry that is an associated with the same objective and with an immediate or prior ancestor of the designated circumstance. The method constructs a rule from data elements collected from ancestor entries.

69 Claims, 11 Drawing Sheets

OTHER PUBLICATIONS

S. Danforth, "Integrating Object and Relational Technologies," Proc. Sixteenth Annual Int'l. Computer Software and Applications Conf., pp. 225–226, Sep. 1992.

E. Bertino and P. Foscoli, "Index Organizations for Object-Oriented Database Systems," IEEE Trans. on Knowledge and Data Engineering, vol. 7(2), pp. 193–209, Apr. 1995.

S. Salvini and M.H. Williams, "Knowledge Management for Expert Systems," IEE Colloquium on 'Knowledge Engineering', 3 pages, May 1990.

P. Morizet–Mahoudeaux, "A Hierarchy of Network–Based Knowledge Systems," IEEE Trans. on Systems, Man, and Cybernetics, vol. 21(5), pp. 1184–1191, Sep. 1991.

T. Chan and W. Hwang, "Towards Integrating Logic, Object, Frame, and Production," Proc. Fourth Int'l. Conf. on Software Engineering and Knowledge Engineering, pp.463–469, Jun. 1992.

W. Sun, et al., "Supporting Inheritance in Relational Database Systems," Proc. Fourth Int'l. Conf. on Software Engineering and Knowledge Engineering, pp. 511–518, Jun. 1992.

M. Stonebraker, "The Integration of Rule Systems and Database Systems," IEEE Trans. on Knowledge and Data Engineering, vol. 4(5), pp. 415–423, Oct. 1992.

V.M. Markowitz and A. Shoshani, "Object Queries over Relational Databases: Language, Implementation, and Applications," Proc. Ninth Int'l. Conf. on Data Engineering, pp. 71–80, Apr. 1993.

L.G. DeMichiel, et al., "Polyglot: Extensions to Relational Databases for Sharable Types and Functions in a Multi–Language Environment," Proc. Ninth Int'l. Conf. on Data Engineering, pp. 651–660, Apr. 1993.

T. Sellis, et al., "Coupling Production Systems and Database Systems: A Homogeneous Approach," IEEE Trans. on Knowledge and Data Engineering, vol. 5(2), pp. 240–256, Apr. 1993.

Y.–M. Shyy and S.Y.W. Su, "Refinement Preservation for Rule Selection in Active Object–Oriented Database Systems," Proc. Fourth Int'l. Workshop on Research Issues in Data Engineering, pp. 115–123, Feb. 1994.

D. Burleson, "Adding behaviors to relational databases," DBMS, vol. 8(10), p. 68(5), Sep. 1995.

M. Riccuiti, "Oracle 8.0 on the way with objects: upgrade will also build in multidimensional engine," InfoWorld, V. 17(39), p. 16, Sep. 1995.

| Objective | | Circumstance | Rule | Rule Status | Next Obj. | Next Obj. Status |
|---|---|---|---|---|---|---|
| Bake | Step 1 | Denver | Oven 350° | Valid | Step 2 | Valid |
| Bake | Step 2 | Denver | | Inherit | Step 3 | Valid |
| Bake | Step 3 | Denver | Bake 30 min. | Valid | Step 5 | Valid |
| Bake | Step 5 | Denver | | Inherit | Done | Valid |
| ... | ... | ... | ... | ... | ... | ... |
| Bake | Step 1 | Boston | | Inherit | | Inherit |
| Bake | Step 2 | Boston | | Inherit | | Inherit |
| Bake | Step 3 | Boston | | Inherit | Step 4(b) | Valid |
| Bake | Step 4 | Boston | | Inherit | | Inherit |
| Bake | Step 5 | Boston | | Inherit | | Inherit |
| ... | ... | ... | ... | ... | ... | ... |
| Bake | Step 1 | USA | Oven 375° | Valid | Step 2 | Valid |
| Bake | Step 2 | USA | Mix Ingred. | Valid | Step 3 | Valid |
| Bake | Step 3 | USA | Bake 20 min. | Valid | Step 4 | Valid |
| Bake | Step 4 | USA | Cool | Valid | Step 4(b) | Valid |
| Bake | Step 4(b) | USA | Cinnamon | Valid | Step 5 | Valid |
| Bake | Step 5 | USA | Serve | Valid | Done | Valid |

Figure 6

RULES BASES AND METHODS OF ACCESS THEREOF

RESERVATION OF COPYRIGHT

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention relates to digital data processing and, more particularly, to rules bases and methods of access thereof.

Computer-based systems for solving problems based on previously defined rules are well known in the art. Often referred to as "expert systems," these systems use rules bases (or knowledge bases) that list—or otherwise represent—problems and their solutions, or that list other collections of facts and corresponding steps or substeps. Typically, the rules bases are compiled from information provided by experts in the respective fields.

A simple expert system can incorporate a rules base directly in the program code. For example, a sequence of "if . . . then . . . else" statements can embody the rules, permitting the program to determine an appropriate solution to conditions input to the system, e.g., by a human operator or by automated monitoring equipment. A simple expert system for determining and displaying loan rates charged at branch offices of a bank might utilize a rules base that is encoded as follows:

```
If (city = Boston) and (state = MA), then display 8.1%.
Elseif (city = Providence) and (state = RI), then display 8%.
Elseif (city = New York) and (state = NY), then display 8.5%.
Elseif (city = Washington) and (state = DC), then display 8.1%
Elseif (city = Sacramento) and (state = CA), then display 7.5%.
Elseif (city = San Francisco) and (state = CA), then display 6.6%.
.
.
.
```

One drawback of such a simple system is that encoding rules using programming constructs such as "if . . . then . . . else" statements make implementation difficult for all but the most limited systems. A further drawback is that the complexity and operational inefficiencies of these systems grow rapidly as their sizes increase.

More complex expert systems employ rules bases that are specified or stored separately from the programs that access them. Rather than encoding the rules in programming constructs, the rules bases store situation/solution data in records. For example, such a rules base might encode the information above in a simple table as follows:

| Boston | MA | 8.1% |
|---|---|---|
| Providence | RI | 8.0% |
| New York | NY | 8.5% |
| Washington | DC | 8.1% |
| Sacramento | CA | 7.5% |
| San Francisco | CA | 6.6% |

Traditionally, a single expert system and rules base are dedicated to a single class of problems. For example, a bank might use one expert system for determining loan rates, another for determining credit worthiness, and so forth.

A more comprehensive rules base could store and access information via two values, i.e., "objective" and "circumstance." The objective identifies the class of problems, e.g., loan rates, credit worthiness, etc. The circumstance identifies the particular situation of interest, e.g., city name (for the objective loan rates), savings balance level (for the objective credit worthiness), etc.

This multi-field approach permits rules for several different classes of problems to be stored in a single rules base. For example, a rules base can store records with rules pertaining to loan rates, e.g., by marking those records as applying to the objective "rate" and further marking them to cite the circumstances to which they apply, e.g., city/state to which each rule applies. Such a rules base can also store rules that pertain to a level of credit to be extended, e.g., by marking those records as applying to the objective "credit" and further marking them to identify the circumstance of "customer type" (such as "preferred" or "standard"), as well as the corresponding level of credit worthiness and credit amount.

An object of this invention is to provide improved rules bases and methods for searching them. More particularly, an object is to provide such systems and rules bases that can be more readily constructed and can be operated with increased efficiency.

A related object of the invention is to provide rules bases that store information without excessive redundancy and that can be easily modified.

Still another object of the invention is to provide such systems and rules bases that can be implemented without undue consumption of computer storage and processing resources.

SUMMARY OF THE INVENTION

These and other objectives are achieved by the invention which provides, in one aspect, a rules base that stores multiple entries in a storage medium, such as magnetic disk, optical disk, read-only memory, or random access memory. Each entry stores information identifying an objective and a circumstance to which a rule pertains. Each entry is also marked to reflect whether information encoded therein corresponds to the rule for that objective/circumstance, or whether some or all of that information is to be sought elsewhere, i.e., in another entry of the rules base. An entry can also be marked to reflect that the objective/circumstance is invalid. The rules base also includes an "inheritance" structure that identifies an ordered—to wit, ancestral—relationship among the circumstances in the entries.

In another aspect, the invention provides a method for determining a rule for a designated objective and circumstance by accessing a rules base of the type described above. The method, which can search the rules base in response to a query specifying the designated objective and circumstance, responds to the identification of a "valid" entry associated with that objective/circumstance by generating a rule based on information in (or associated with) that entry.

According to one aspect of the invention, if the method fails to identify an entry associated with that objective/circumstance, it generates a rule based on information associated another entry in the rules base—particularly, an entry that is associated with the same objective and with an immediate or prior ancestor of the designated circumstance. According to another aspect of the invention, if the method identifies an entry associated with that objective/circumstance, it generates a rule by combining information in that entry (and its rule elements) with information in entries (and rule elements) associated with the same objective and with an immediate or prior ancestor of the designated circumstance.

The method can determine an immediate ancestor of the designated circumstance from the inheritance structure provided in the rules base. It can use that ancestor circumstance, along with the designated objective, to search the rules base for a valid rule matching that objective/circumstance combination. If found, the method generates a rule based on information associated with that entry.

If no entry is found matching the designated objective and first ancestor circumstance, or if the found entry is marked for inheritance, the method uses the inheritance structure to determine a second ancestor of the designated circumstance. The method then searches the rules base for an entry associated with the designated objective and with that second ancestor circumstance. The method continues this iterative process until it finds a valid entry matching the designated objective and an immediate or prior ancestor of the designated circumstance, which entry it then uses for generating a rule for the designated objective/circumstance.

In further aspects, the invention provides a rules base as described above in which there are provided multiple inheritance structures, each defining a collection of ancestral relationships of circumstances for a respective objective, or set of one or more thereof. In a related aspect, the aforementioned method determines the immediate or prior ancestors of a designated circumstance from the inheritance structure corresponding to the designated objective. The method can move from one collection of circumstances/objectives to another to continue the inheritance processing if the initial collection is not sufficient to generate an applicable rule.

In still further aspects of the invention, a rules base as described above includes one or more entries that identify a further condition that must be satisfied in order to determine whether that entry contains the rule for the corresponding objective/circumstance. Parallel methods provide for determining whether the condition is satisfied before generating a rule based on information in an entry, and responding to a failure of satisfaction for generating a rule based on information associated with an ancestor entry. That determination can be made, for example, by invoking a call-back software module to obtain the requisite information, or by querying the operator or other information stores.

Yet still further aspects of the invention provide a rules base as described above in which at least one entry contains multiple rules elements. By way of example, in an entry for the objective "branch office business hours," multiple rule field elements can store office hours for each day of the week. Each such field element is marked to reflect whether it contains a rule element, or whether the corresponding rule element should be sought elsewhere, e.g., in a corresponding field of an entry associated the same objective and with an ancestor circumstance. In addition, each rule entry as a whole may have a status (or conditions) controlling whether the rule entry should be skipped during inheritance processing or be considered invalid.

In related aspects, a method as described above can respond to identification of a multi-rule entry matching a designated "key fragment" and objective/circumstance for generating all valid rules in that entry and for generating all inherited rules from entries that are associated with a similar objective and with an immediate or prior ancestor of the designated circumstance. In this way, the method is capable of compiling a list of rules distilled from multiple entries across the ancestor circumstances.

Yet still further aspects of the invention provide a rules base as described above in which at least one entry is associated with a multipart objective. Such an objective—which can take the form "Assemble | Step 1," "Assemble | Step 2," and so forth—can be used, for example, to coordinate access to sets of related rules that define manufacturing procedures. In a related aspect, a method as described above responds to the identification of a valid entry that is associated with a multipart objective for generating (along with a rule corresponding to information in that record) an identifier that forms part of the multipart objective of a related entry, e.g., an entry containing a rule for the next step in a procedure. The method can return that identifier to an applications program that generated the original query, or it can retain the identifier internally to facilitate finding the next entry in response to the next query from that program. The next rule identifier can be stored, for example, as a rule in a multi-rule entry of the type described above. In this way, the value of an identifier can be inherited from a ancestor entry.

According to other aspects of the invention, an applications program software module can generate a structured request, e.g., in "Structured and Query Language" SQL format, for determination of a rule for a designated objective and circumstance. The methods described above can then be executed by a rule finder software module to make that determination.

These and other aspects of the invention are evident in the drawings and in the descriptions and claims that follow.

BRIEF DESCRIPTION OF THE DRAWINGS

A more complete understanding of the invention may be attained by reference to the drawings, in which:

FIGS. 4–6 depict sample rules bases according to the invention;

DETAILED DESCRIPTION OF THE ILLUSTRATED EMBODIMENT

Figure 1:
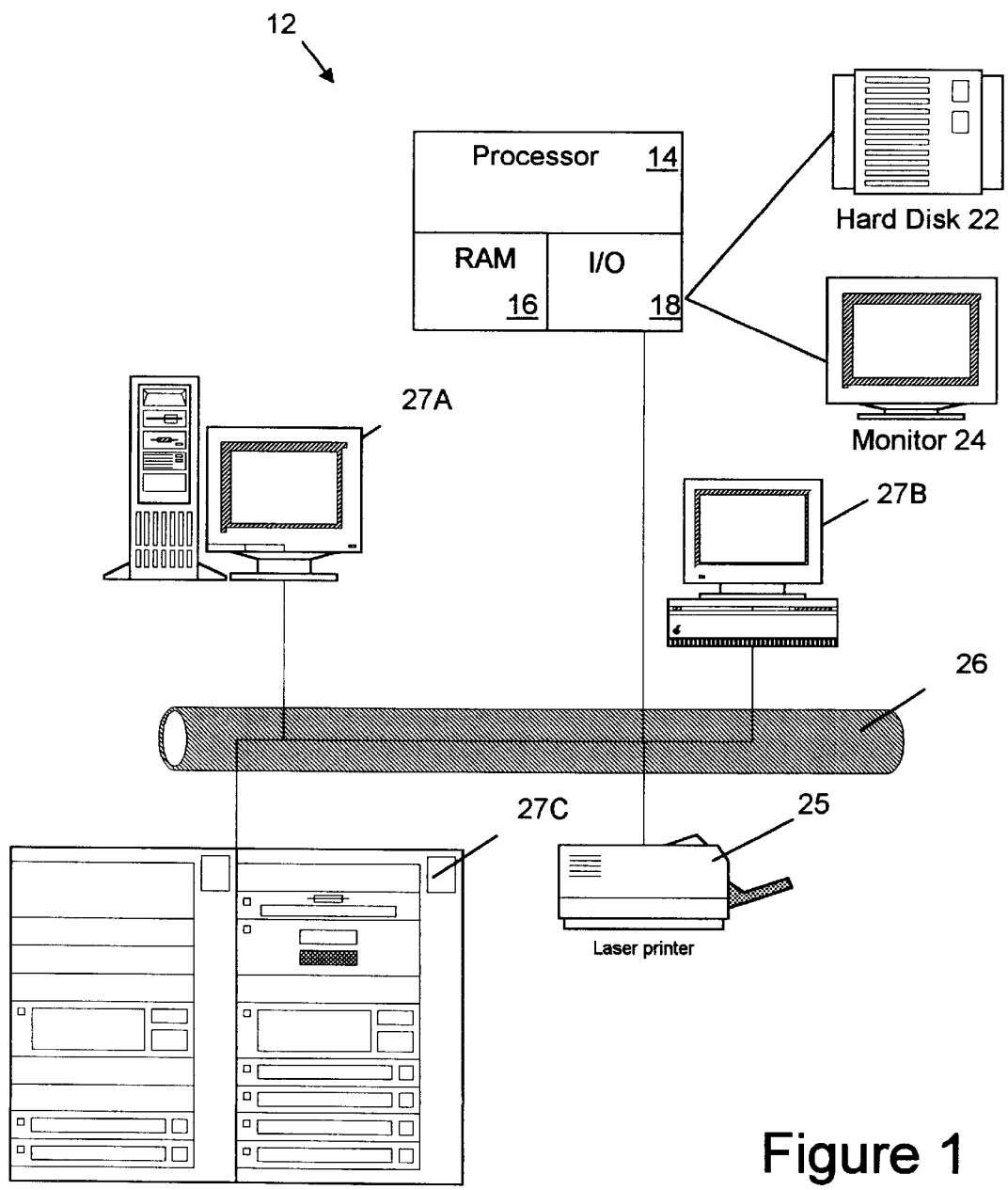
FIG. 1 depicts a digital data processing system of the type with which the invention is practiced.

FIG. 1 depicts a digital data processing system for use in operation of the invention. The system includes a digital data processor 12, including a processor section 14, a random access memory section 16 and an input/output control section 18. The digital data processor 12 is connected, via input/output control section 18, to workstation 24 (including a monitor, keyboard and pointing device) and to hard disk 22 for storage of software and data. The digital data processor 12, along with other computers 27A, 27B and printer 25, are coupled via network 26 to file server 27C.

Digital data processor 12, as well as its sub-components 14–18 and peripherals 22–24, preferably comprise a conventional commercially available personal computer or work station adapted in accord with the teachings below for storing and accessing a rules base. Computers 27A, 27B, laser printer 25, network 26 and file server 27C also comprise conventional commercially available components of their respective types. Computers 27A, 27B can likewise be adapted in accord with the teachings below for storing and accessing a rules base.

Those skilled in the art will appreciate that, in addition to implementation on stand-alone or "networked" computers of the type shown in FIG. 1, the methods and apparatus taught herein can be implemented on other digital data processing apparatus of the type known in the art, e.g., mainframe computers, dedicated microprocessor-based systems, etc.

Figure 2:
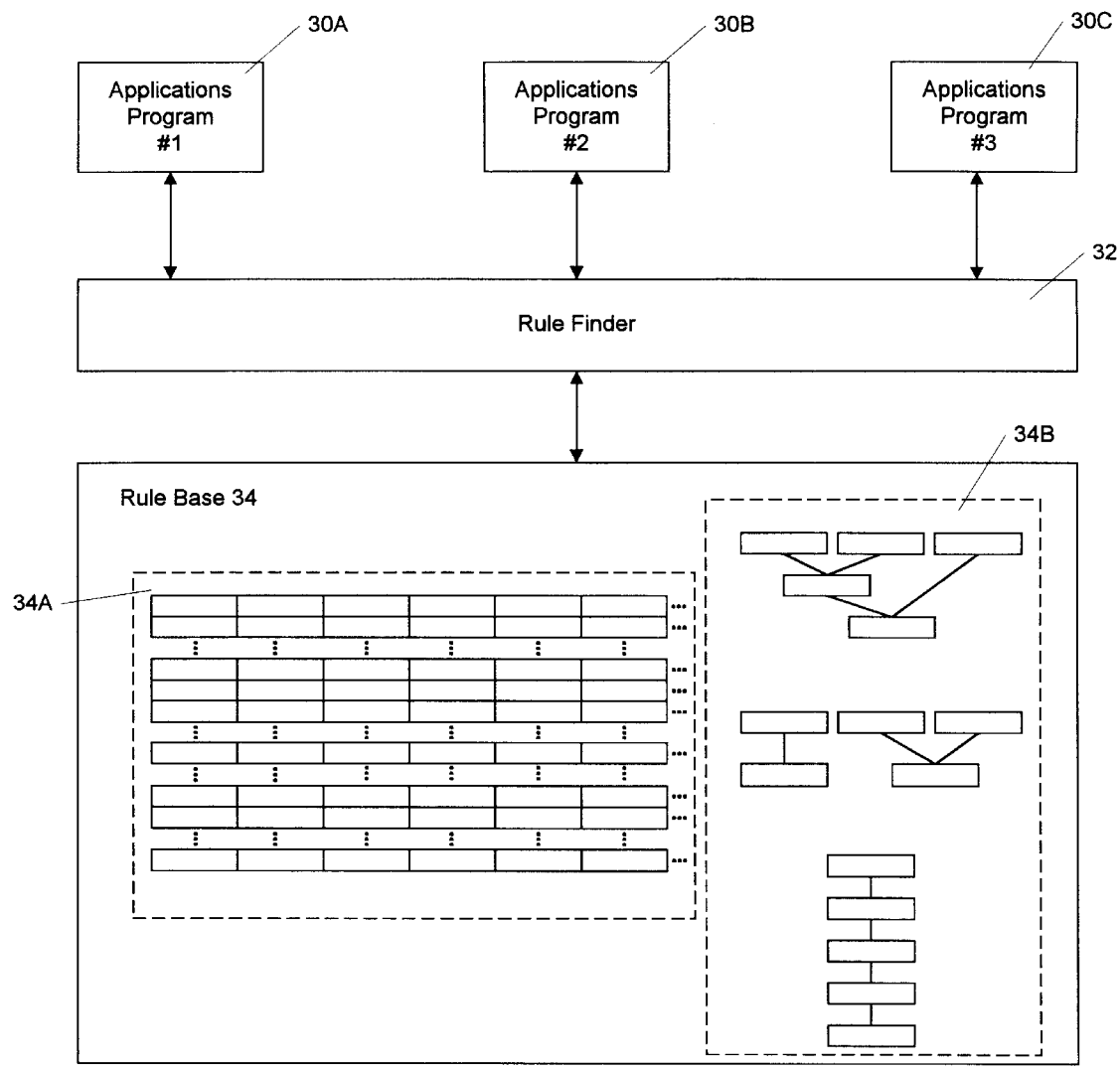
FIG. 2 depicts a relationship between an applications program, a rule finder and rules base according to the invention.

FIG. 2 depicts a relationship between applications programs 30A, 30B, 30C, and a rule finder 32 and rules base 34 according to the invention. The applications programs 30A–30C are conventional software programs operating on digital data processor 12. These can be, for example, conventional programs of the type used by customer service representatives to facilitate answering customer inquiries or setting up customer accounts. Alternatively, these programs can be of the type used in manufacturing industries to assist in formulating or carrying out production processes. More generally, applications programs 30A–30C represent any software, any user interface or other functionality that would benefit from generating a rule request that specifies an objective and circumstance. Such requests can be in any format, for example, in the industry standard SQL format.

Figure 7:
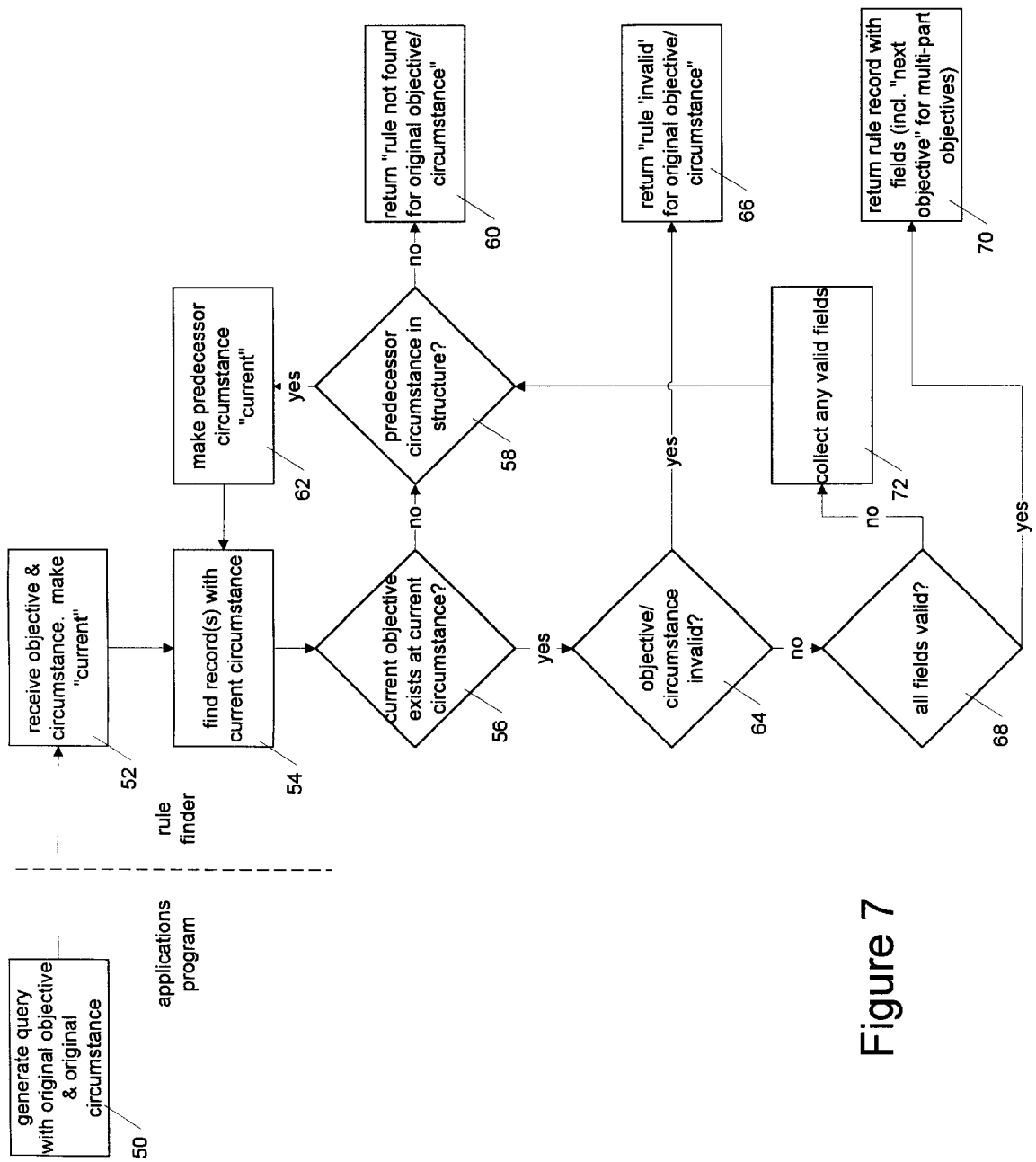
FIG. 7 depicts a method for accessing a rules base according to the invention in order to find a rule meeting a designate objective/circumstance.

Rule finder 32 responds to requests generated by the applications programs 30A–30C by accessing rules base 34 to determine rules corresponding to the objective/circumstance specified in each such request. The rule finder 32, which is preferably implemented in the software modules independent of applications programs 30A–30C, operates in the manner discussed below and illustrated in FIG. 7.

Illustrated rules base 34 has two parts: 34A, 34B. The rules base is digitally encoded and stored on any conventional digital data processing storage medium or computer-readable medium, e.g., random access memory, 16, read-only memory (not shown), CD ROM (not shown), hard disk 22 and/or file server 27C. The first part, 34A, contains multiple entries, or records, each associated with an objective and a circumstance, as discussed further below. The second part, 34B, contains a structure defining an ordered—and, more particularly, an ancestral—relationship among the circumstances associated with the records in the first part 34A.

Figure 3:
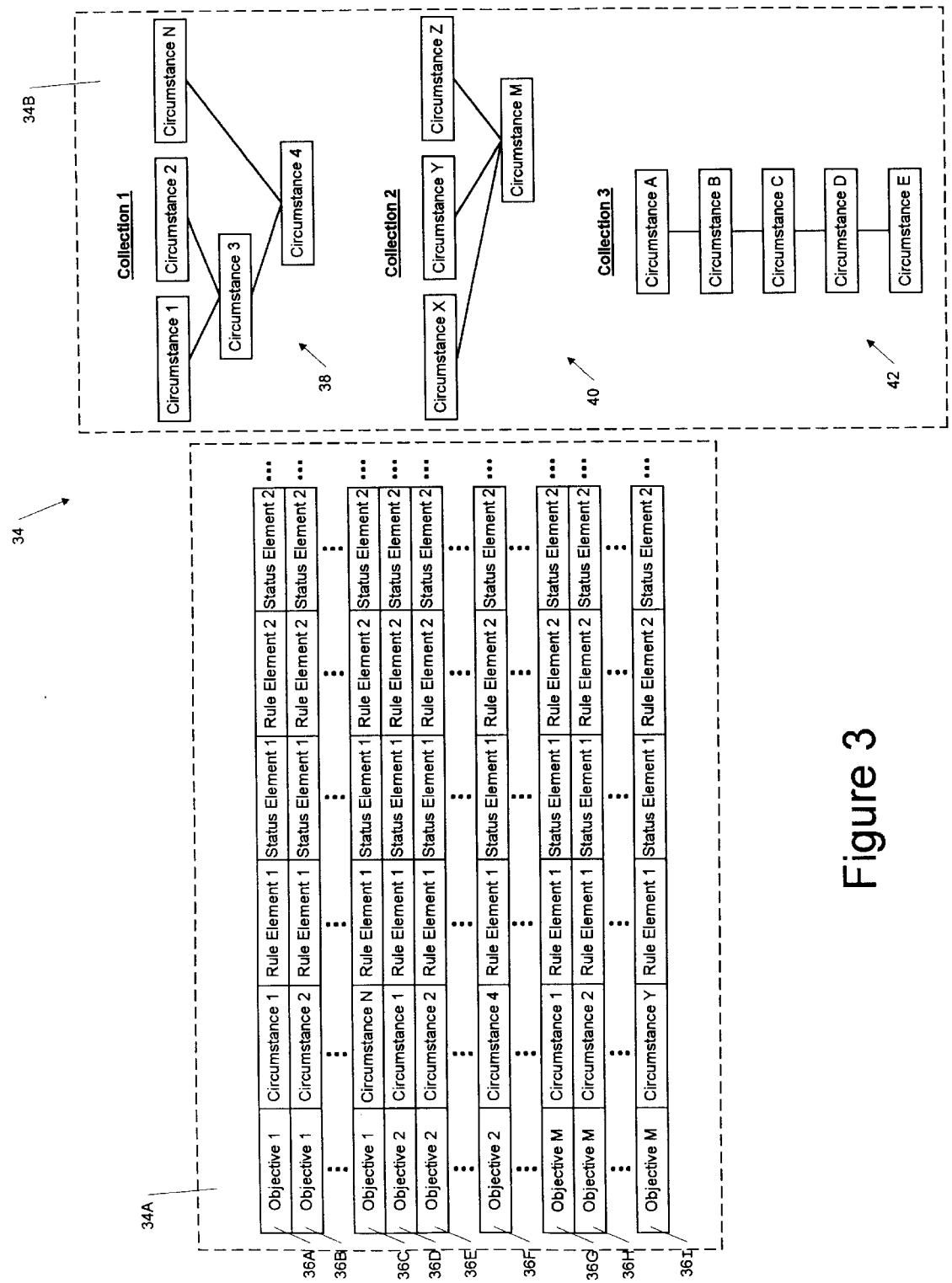
FIG. 3 depicts a structure of a rules base according to the invention.

Referring to FIG. 3, the rules base 34 and its component parts 34A, 34B are shown in greater detail. Particularly, part 34A is shown as including a plurality of records 36A–36I. Each record 36A–36I is associated with an objective and a circumstance, as well as with a status and, optionally, one or more fields. Thus, for example, record 36A stores the objective "Objective 1" and the circumstance "Circumstance 1." In lieu of storing these values directly in the record 36A, they can be associated with a record by other techniques known in the art, e.g., pointers, linked lists, relational database fields, etc.

As shown in the illustration, the objective/circumstance value associated with each record is unique as to that record. Thus, for example, record 36A contains the unique objective/circumstance combination "Objective 1/Circumstance 1," while record B contains the unique combination "Objective 1/Circumstance 2." While such uniqueness is preferred, it is not dictated by the invention if there is an order, substeps, or other facts to allow the rule finder 32 to return an appropriate rule should an objective/circumstance be specified.

Each of the records 36A–36I has at least one status field and one rule field. In the illustration, these are labelled as "Status Element 1" and "Rule Element 1," respectively. As above, values of the statuses may be stored in the respective records or otherwise associated with rule entries or rule elements by any other manner known in the art, e.g., pointers, linked lists, named fields, fixed positions, etc.

As shown in FIG. 3, each of the records 36A–36I include multiple status/rule field pairs. In the illustrated embodiment, a status value of "valid" indicates that the corresponding rule is valid for the objective/circumstance associated with that record. In the case of a record with only one status field and one rule field, a valid status indicates that rule field stores a rule (or information associated therewith) for the associated objective/circumstance. In the case of a record with multiple status/rule field pairs, an "inherit" status typically means that a particular rule (or a portion of the rule) for the objective/circumstance is to be sought elsewhere, to wit, in another record.

A status value of "invalid" may be associated with the entire rule to indicate that the corresponding rule is invalid. In this case, an invalid status indicates that the corresponding objective/circumstance is invalid and inheritance is not generally performed on the associated rule.

Figure 5:

As shown in FIG. 5, a record with multiple status fields can include one that does not have a paired rule field. In that instance, the unpaired status field serves as a status field for the record as a whole, e.g., indicating whether there is any valid or inherited rule for the objective/circumstance or, alternatively, whether the objective/circumstance is invalid. An unpaired status field may be the only status field in a record, in which case it provides status for all rules in the record.

The records 36A–36I need not be of identical length nor contain identical numbers of fields. However, in a preferred embodiment, records pertaining to like objectives are similar structures, thus, for example, records 36A–36C which pertain objective "Objective 1" would include a like number of fields and parallel structures.

The second part 34B of rules base 34 reflects the ordered relationship, or "inheritance" or "ancestral" relationship, of the circumstances contained within the records of the first part 34A. More particularly, it reflects an order in which records having a given objective are searched when (i) no record having the objective/circumstance specified in a query, e.g., by the applications programs 30A–30C is found, or (ii) a valid record matching the objective/circumstance designated in a query has a status, to wit, "inherited," indicating that the corresponding rule is to be sought elsewhere, or (iii) a validation condition disqualifies the current entry. The relationships can be reflected by a hierarchy, a network, or any other structure reflecting precedence. For convenience, the ordered relationship reflected by the structures of part 34B are referred to herein using the terminology of inheritance or ancestry.

As those skilled in the art will appreciate, as used herein, the term "inheritance" refers inter alia to the process through which ancestor records are examined to provide or complete the synthesis of a rule to be returned by the rule finder 32.

Thus, for example, the collection structure 38 reflects that for Objective 1, Circumstance 1 and Circumstance 2 are descendants of Circumstance 3. In turn, Circumstance 3 and Circumstance N are descendants of Circumstance 4. As a consequence, if an applications program 30A–30C generates a query for a rule for combination Objective 1/Circumstance 2 and corresponding record B has a status of "inherited" (or if no such record is found), the rule finder 32 seeks a record with the combination Objective 1/Circumstance 3. If that record, too, has a record or field status of "inherited" (or if no such record is found), the rule finder 32, in turn, seeks a record having the combination Objective 1/Circumstance 4.

Although a single collection structure, e.g., 38, can define the ancestral relations of circumstances for all objectives in the records of part 34A, multiple collection structures can be provided. For example, as illustrated in FIG. 3, a collection structure 40 can define an ordered relation of circumstances for Objective 2, while a collection structure 38 and 40, together, defines an order relation of circumstances for Objective M. In accordance with this example, the same objective name may appear in multiple collections, in which case the collections will be navigated in a predefined order for the rules base.

Figure 4:
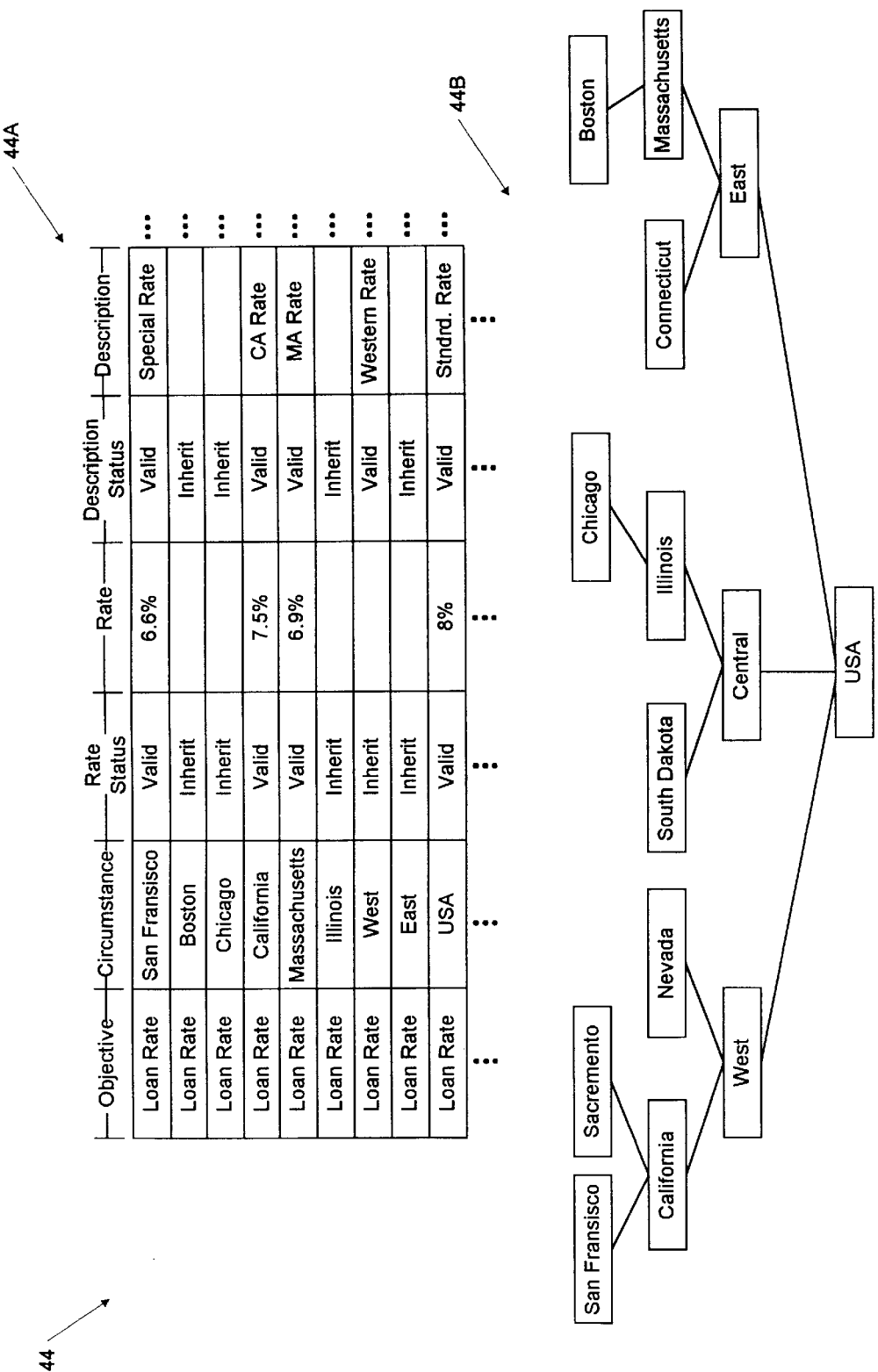

FIG. 4 depicts an instance of the rules base shown in FIG. 3. The rules base 44 of FIG. 4 includes a first part 44A, containing entries, or records, providing rules for the objective "Loan Rate," and a second part 44B, containing a structure reflecting an ancestral relation among circumstances in the records of part 44A.

Referring to part 44A, there is shown a rules base 44 entry for the objective "Loan Rate" and circumstance "San Francisco." That record has statuses of "valid" relating to two rule elements. The first rule element contains information indicating that the Loan Rate for San Francisco is 6.6%. The second rule element in the record is a valid "description" rule indicating that the loan rate is a "Special Rate." In response to a request, the Rule Finder 32 returns those rule elements to the querying program 30A–30C.

The first part 44A of rules base 44 also includes a record for the objective/circumstance combination "Loan Rate"/"Boston." As reflected by the overall status fields in that record, both rule elements for that objective/circumstance are inherited. Referring to the structure in part 44B of the rules base 44, it is seen that the circumstance "Boston" is a descendant of the circumstance "Massachusetts." Accordingly, in attempting to determine rules for the objective/circumstance "Loan Rate"/"Boston," the rule finder 32 search seeks a record with the combination "Loan Rate"/"Massachusetts." Such a record exists in the illustrated embodiment. From it, the rule finder 32 determines that the rules for the combination "Loan Rate"/"Boston" are "6.9%" and "MA rate." It returns those rule elements to the querying program 30A–30C.

The first part 44A of rules base 44 further includes a record for the objective/circumstance "Loan Rate"/"Chicago." That record, too, has both rule elements marked for inheritance. Referring to the structure of part 44B, it is seen that the circumstance "Chicago" is a descendant of the circumstance "Illinois." Rule finder 32, accordingly, seeks a record with the objective/circumstance "Loan Rate"/"Illinois." Because that record too has both rule element fields marked for inheritance, the rule finder 32 seeks a record with the combination "Loan Rate"/"Central." No such record exists, however, in the illustrated rules base 44. Accordingly, the rule finder 32 makes further reference to the structure in part 44B, indicating that the circumstance "Central" is a descendant of the circumstance "USA." The rule finder 32 thus seeks a record with the objective/circumstance "Loan Rate"/"USA. " As shown in the illustration, such a record exists and has two valid rules indicating that the Loan Rate is 8% and that this is a "standard" rate. From this, the rule finder 32 would infer that the rule for the original objective/circumstance "Loan Rate"/"Chicago" is a standard 8% rate. It returns those rule elements to the querying program 30A–30C.

Although in the prior examples, the records in part 44A were designated as having two valid status fields, it will be appreciated that the status corresponding one rule element in the record may be valid, while another other is inherited.

As evident above, the records or entries in a rules base according to the invention can include multiple rules. A further example of this is shown in FIG. 5. There is illustrated the first part of a rules base 46 containing records pertaining to the objective "Hours" and the respective circumstances "San Francisco," "California," "West," "East," and "USA." An initial status field in each record indicates whether the corresponding objective/circumstance combination is valid, e.g., whether there are business hours for branch offices in the respective city, state, regions or country. In the illustration, this status field is marked as "valid" in all of the records.

The multi-rule records of part 46 include further rules reflecting the business hours for each day of the week. As above, each rule element is associated with a status. For example, the record for the combination "Hours"/"San Francisco" has an invalid status for Sunday, indicating that the store is not open that day. That same record has a status reflecting that the Monday hours are inherited from another record. That record further shows a pair of valid rule elements for the Tuesday business hours, specifying that they are 9 a.m. to 9 p.m.

A rules base according to the invention can also be used to store sequences of rules, e.g., procedures. These can be, for example, sequences reflecting how to open a customer account, how to process a customer claim, or how to manufacture a product. FIG. 6 illustrates a rules base 48 storing sequences of rules for baking, e.g., cakes. Unlike the embodiments shown in FIGS. 3–5, each record in rules base 48 of FIG. 6 includes a two-part objective. Thus, the first record in the illustrated rules base is for the two-part objective "Bake-Step 1" and for the circumstance "Denver." That record contains a valid rule indicating that the oven is to be preset to 350°.

That record further includes a valid rule identifying the next rule in the baking sequence. More particularly, that rule identifies the second part of the two-part objective of the next record in the sequence. In the illustrated example, that identifier is "Step 2." Those skilled in the art will appreciate how additional key segments (three or more) could be used to provide further extension of structure and control.

A rule finder 32 finding rules in rules base 48 for the objective "Bake" and circumstance "Denver" uses the next-record identifier in each record to construct complete, two-part objectives with which to search the rules base 48. In the preceding example, the rule finder 32 can construct from the next-rule identifier contained in the "Bake-Step 1"/"Denver" record, the objective "Bake-Step 2." Combining that two-part objective with the original circumstance, "Denver," the rule finder 32 can identify the next rule in the baking sequence. This process continues until all rules in the sequence are identified, as indicated, e.g. by a next-rule identifier of "Done."

Referring to the illustration, the record for objective/circumstance "Bake-Step 2"/"Denver," requires an inherited rule. Assuming that the second part (not shown) of the rules base 48 indicates that the circumstance "Denver" is a descendant of the circumstance "USA," the rule finder 32 seeks a record with the combination "Bake-Step 2"/"Denver." In the illustration, that record exists, revealing that the next step is "mix ingredients." That record also specifies that the next rule is "Step 3." With this information, the rule finder 32 constructs a two-part objective "Bake-Step 3" and searches for a record combining that objective with the circumstance "Denver." In this same manner, the rule finder 32 determines the entire sequence for the "Bake"/"Denver" procedure. Selection of valid or applicable rules may be subject to condition evaluation as described above.

A further variation of this is reflected in the records of rules base 48 for the circumstance "Boston." As shown in the illustration, the majority of rules in that sequence are inherited, e.g., from the records for the circumstance "USA." One of the Boston baking sequence records, however, calls for inclusion of an additional step. Particularly, the record for the combination "Bake-Step 3"/"Boston" includes a valid next objective identifier "Step 4(b)." On processing that record, the rule finder 32 seeks a rule for the combination "Bake-Step 4(b)"/"Boston." Since no such record exists in the illustrated rules base 48, the rule finder 32 seeks a record with the same objective but a related circumstance, to wit, a record with the combination "Bake-Step 4(b)"/"USA."

Such a record exists in the illustrated rules base 48. On generating a rule based on the information in that record and passing that rule back to the querying program 30A–30C, the rule finder 32 construct a new objective, to wit, "Bake-Step 5." Combining that with the original circumstance "Boston," the rule finder 32 seeks a record matching that objective/circumstance combination. In this manner, a rule finder 32 identifies a sequence of rules for the objective "Bake"/"Boston."

Described above are embodiments of rules bases according to the invention, along with salient aspects of the operation of rule finder 32. A more formal depiction of the operation of rule finder 32 is provided in the flow chart of FIG. 7.

To begin, the rule finder's operation is invoked upon the generation of a query by an applications program 30A–30C. As reflected in Step 50, that query includes an original objective and an original circumstance for which the applications program seeks a rule (or rules). As noted above, that query can be in SQL format.

The rule finder receives the objective/circumstance generated by the applications program 30A–30C and denotes them, internally, as "current." The rule finder then searches the first part of the rules base for records matching the "current" circumstance; See step 54.

In step 56, the rule finder determines whether any of the found records meet the "current" objective. If not, step 58 requires that the rule finder search the structure in the second part of the rules base for an ancestor of the current circumstance. As noted above, if that second part includes multiple structures, the rule finder searches the structure corresponding to the current objective.

If no ancestor circumstances are found, the rule finder returns a message indicating that no rule was found for the original objective/circumstance. See step 60. If, on the other hand, a predecessor to the current circumstance is found in the second part of the rules base, the rule finder 32 denotes that predecessor circumstance as "current;" See step 62. Using this new current circumstance, the rule finder again searches the rules base for records with that circumstance. See step 54.

According to step 64, if the rule finder did find a record meeting the current objective and current circumstance, the rule finder determines whether that record is marked as invalid or is invalid due to conditions evaluated by a calling program. If so, the rule finder returns a "rule invalid" message to the calling program 30A–30C. See step 66. On the other hand, if the record meeting the current objective/circumstance is not invalid, the rule finder determines whether all rules making up that record are valid. See step 68. If so, rule 70 calls for the rule finder to return that rule record (or the rules contained therein) to the calling program 30A–30C.

If not all the rules in the identified record are valid, i.e., some are inherited, the rule finder 32 collects all valid fields and, then, returns to step 58 to identify predecessors of the current circumstance. See step 72.

In this manner, and as further described above, the rule finder searches the rules base to determine rules corresponding to an objective/circumstance specified by the calling program 30A–30C.

As reflected in step 70, rules bases containing rule sequences are processed in a similar manner, albeit the rule finder 32 returns, along with rules meeting the designated objective/circumstance, a next-rule identifier for use in constructing a next objective with which to query the rule finder. Alternatively and preferably, this next objective identifier is retained within the rule finder, so that the calling program 30A–30C can automatically invoke a search for the next record in the sequence by issuing the request for a "next" rule and giving the prior/current values as input. For example, after generating a query for the objective/circumstance "Bake-Step 1"/"Denver," the calling program generates a query for the objective/circumstance "Bake-Step 1(next)"/"Denver." In this scenario, the rule finder 32 utilizes the retained next identifier value to interpret that query as calling for the objective/circumstance "Bake-Step 2"/"Denver."

In a preferred practice of the invention, the rule finder 32 can use a conventional function call return value to indicate to a requesting applications program 30A–30C the result of a request. A preferred embodiment uses an integer method return status associated with each method to return a value which corresponds to a specific result and may be used to direct further processing in the calling program 30A–30C. A table of such values is provided below. Of course, those skilled in the art will appreciate that other embodiments of the invention may utilize alternate or more specific values and/or data types that would allow greater granularity and specificity in the subsequent processing by the calling program.

| Value | Meaning | Comment/Description |
|---|---|---|
| 10 | Success | Performed as expected for request |
| 30 | Problem-Value Not Found | Unable to retrieve or update because designated value was not found |
| 40 | Problem Duplicate Found | Unable to update as expected due to duplicate being found |
| 99 | General Problem | Other problem than those defined above |

In addition to storing rules that correspond to designated combinations of objective/circumstance, those skilled in the art will appreciate that rules base as described above can also be used to validate information supplied by an applications program 30A–30C. For example, the first part of a rules base can store records that contain, for each objective/circumstance, one or more permissible values. An applications program 30A–30C can invoke the rule finder 32 by specifying an objective/circumstance, along with the information to be validated. Upon finding a record with a matching objective and matching or related circumstance, the rule finder can compare the information to be validated with the permissible values contained within that record. By this means, the system permits validation of the information supplied by an applications program.

Definitions and Data Structures

A further understanding of the invention may be attained through an understanding of the following terms, data types and concepts:

a) Rules Base

A collection of Rules (possibly, a very broad assortment of rules) that is identified by a unique Rules Base Name. In a preferred embodiment, this name is a 12 byte character string. Of course, those skilled in the art will appreciate that other embodiments of the invention may utilize a name of different or variable length comprised of one or more data types.

(a) Rule Collection

A subgroup of Rules in a Rules Base which subsets and brings organization to the Circumstances and Objectives defined in the Rules Base, as collections have an implied or specific traversal order identified in the Rules Base. Each Rule Collection has a specific Rule Collection Name, but that Rule Collection Name may not need to be specified on calls to the Rules Base if the Objective that is specified is only defined within a single collection in the Rules Base or if there is a designated order of precedence to the collection. In a preferred embodiment a Rule Collection name is defined as a 12 byte character string. Of course, those skilled in the art will appreciate that other embodiments of the invention may utilize a collection of different or variable length comprised of one or more data types.

(b) Circumstance Name

Each Rule Collection may include one or more Circumstances in which the rules apply. In a preferred embodiment, each circumstance is defined by a Circumstance Name of up to 20 alphanumeric bytes. Of course, those skilled in the art will appreciate that other embodiments of the invention may utilize a variety of individual or compound data types of fixed or variable length and possibly separated with delimiters.

In any place in which a Circumstance can be used for Inherited traversal of the Rules Base, it is also possible to specify a list of starting Circumstances that will be traversed in order. Thus, if a set of Circumstances exists using a geographical model (as shown in FIG. 4), a calling program can provide a list of circumstances such as "Boise/Idaho/Midwest" as insurance against the possibility that neither Boise nor Idaho were in the Circumstance definition. As discussed above, should "Boise" not be found in the Rules Base, the Rule Finder will proceed to search using the value of Idaho. Should Idaho be found, the Rule Finder will ignore the "Midwest" or subsequent specifications.

(c) Circumstance Ancestor Definition

Each Rule Collection brings organization to a set of Circumstances by defining the order in which Circumstances are to be navigated to find a match on a particular objective. In a preferred embodiment, the Circumstances are defined in terms of a tree hierarchy consisting of one or more Circumstance Nodes. Each Node in the tree structure has zero, one or multiple children circumstances. Of course, those skilled in the art will appreciate that other embodiments of the invention may support alternative organizations with greater flexibility than a hierarchy tree-type structure, including forms of directed graphs, network organizations, or explicit search lists.

The base Node in a collection has an ancestor Circumstance Name of the Collection Name identified by the literal string constant of '$ROOT'. Of course, those skilled in the art will appreciate that other embodiments of the invention may utilize an alternate value or a value whose definition is defined by a value in the Collection data structure.

(d) Objective Name

The Name of an Objective varies in length and consists of one character string or multiple character strings separated by hyphens or periods, i.e. "-" or ".". The Objective Name is either the key that uniquely identifies the Rule, or a portion of the key that limits the number of applicable rules to a subset of the rules base. The key can be of the format "RULE-CLASS.OBJECTIVE." Of course, those skilled in the art will appreciate that other embodiments of the invention may utilize a single element, a series of fixed length elements, and/or a mix of variable and fixed elements (including alternate data types such as Integers) separated by a variety of alternative separating values.

(e) Rule Key

A Rule Key is an intersection of an Objective and Circumstance that together uniquely defines a Rule. The Rule Key may be partially specified on request of a rule, but when the Rule Finder function returns a Rule it will always be identified by a specific key. In the case of a returned Rule assembled from Rule fragments collected from partial records retrieved at multiple circumstances, the Rule Key is the first Circumstance/Objective combination that contributed to the assembly of the Rule as appropriate to uniquely define the key.

(f) In addition to the other fields described herein, the records in the Rules Base can include, for example, the following information:

(1) Date added, Version Control, and other such information for facilitating management of the Rules Base.

(2) "Not There" indicator. The rule finder 32 responds to this field in a record for returning "not found" (or "not valid") to a requesting applications program 30A–30C, without continuing to traverse up the hierarchy. The existence of this indicator suspends additional editing of fields in this record. Additionally, the a "verified" or "not yet verified" field can be included to suspend the availability of rules pending management approval or until a designated time period is in effect.

Relationships Between Data Structures

Preferred relationships between the aforementioned data structures are indicated below, wherein defined Terms are underlined:

(a) Rules Base Contains:

(1) One Or Many Collections (of Circumstances)

(2) Many Rule Objective Names

Note that it is possible for a Rule Objective Name to span multiple Collections.

(b) Collections Contain:

(1) Many Circumstances (each with an Ancestor definition)

(c) Circumstances Contain:

(1) Many Rule Objective instances

Rule Structure Definition

In a preferred embodiment, the rules base includes control information records including the following entities:

(a) Position of Rule Status Flag

Identifies the location of the value in the field where the optional status that controls overall Rule Inheritance is defined. Of course, those skilled in the art will appreciate that other embodiments of the invention may utilize a rule definition that generally supports records in a data storage environment where the data elements are accessible by name or have logical descriptors instead of being described positionally in a record structure, e.g., a relational database environment would have a Field Name as an alternative to the Position of Rule Status Flag.

(b) Rule Element Field Descriptor

This is used to identify the overall structure of a rules base. In supporting rules defined in a system where the records are based on a particular record structure, each field for which collection is intended to work has the following characteristics defined:

(1) Element Id

An identifier of the field involved.

(2) Start and End Position of field (3) Position of Inheritance Value Status Flag If the field itself is configured to hold the value this will be the same as the Position of Rule Status Flag.

(4) Inheritance Value

The value in the field that indicates that inheritance is supported.

Those skilled in the art will appreciate that other embodiments of the invention may utilize multi-byte status fields or the use of different types of status fields for different fields, i.e., allowing some of the fields to be defined as part of the underlying data and allowing some of the fields to have explicitly defined alternative fields to hold the status value. Those skilled in the art will also appreciate that other embodiments of the invention may utilize a rule definition that supports records in a data storage environment where the data elements are accessible by name or have logical descriptors instead of being described positionally in a record structure, e.g., a relational database environment in which a field names are used as alternatives to the Start Position, End Position and Position of Inheritance Value Status Flag.

Inheritance Structure Definition

In a preferred embodiment, the second part of the rules base, e.g., 34B, comprises the following structures:

(a) Inheritance Structure

Provides the structure of the Rules Base to support the navigation of Circumstances. In one embodiment, this supports a series of Named Hierarchies of Circumstances, where each hierarchy represents a structure of Circumstances by explicitly indicating applicable ancestor circumstance. Where different Objectives are organized by different structures of Circumstances, a single Rules Base can contain multiple (and possibly alternately organized) structures of circumstances.

Of course, those skilled in the art will appreciate that other embodiments of the invention may utilize other forms of precedence organization, such "lists" designating the relative precedence of circumstances or a "network" structure. What is distinguishing about the organization of circumstances is the ability to always find the "ancestor" circumstance if one exists from a given circumstance, and the ability to definitively know when the final node of a circumstance chain has been reached and that there are no further circumstances to traverse. Those skilled in the art will also appreciate that other embodiments of the invention may utilize other types of structures to reflect this core organization, e.g., a linked lists of nodes, and the opportunity to put an attractive user interface, e.g., a tree control in a Windows™ environment, on top of such structures.

(b) Objective to Inheritance Association

Given an Objective and the possibility of more than one inheritance structure within a Rules Base, there is a need to be able to determine which structure should be traversed in the event that an Objective is specified. Accordingly, each Objective can be tracked in a data structure that identifies which Inheritance is being used to inherit Rules for that Objective. The structure of such a table (whether kept in a relational Data Base or in another Data Store) serves to associate and order Objectives with Collections of Rules within the Rules Base.

Methods for Rules Base Management

Definitions for methods that display or augment elements in the Rules Base are provided below. These definitions represent a preferred approach for creating interface objects that will facilitate access and management of the structures that define the Rules Base. Though the function call definitions and summary of steps are not supplied, those skilled in the art will readily appreciate that the methods can be readily made from the definitions that follows.

Those skilled in the art will also appreciate that other embodiments of the invention may utilize alternate methods, including methods that (i) perform similar functions with alternate levels of granularity or (ii) techniques based on the creation and editing of textual files to define the structure and/or defaulting mechanisms through which certain values might be defaulted or constructed automatically in the event that they are not specified by the calling routine and the ability to attach security criteria to all or a subset of the defined objects to limit access and/or modification of such objects.

(a) Method: Rule-Base.Add

This fundamental call creates and identifies an instance of the Rules Base. It associates the defined input name with the Rules Base, as well as the description used in presenting and displaying the Rules Base. If a Rules Base of that name already exists, the specified description is used to modify the existing description of the Rules Base.

| In/Out | Value | Description/Comments |
|---|---|---|
| Input | Rule-Base Name | |
| Input | Description | String |

(b) Method: Rule-Base.Display

Figure 9:
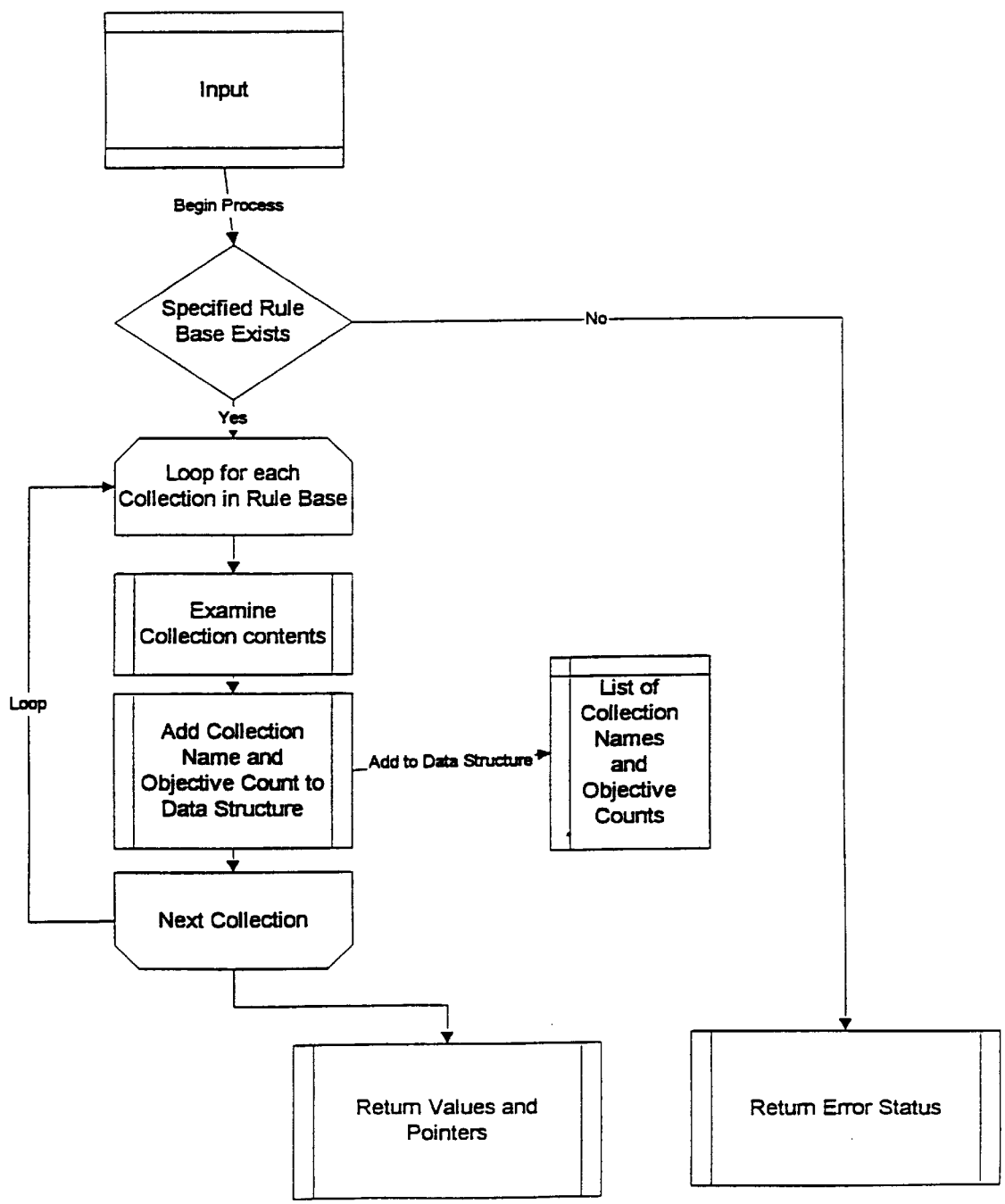

FIG. 9 shows a method allowing display of information in the Rules Base. Given a Rules Base name as input, the method provides output consisting of the description of the Rules Base (useful in reports and other displays), and a pointer to a data structure consisting of sets of collection names, the counts of circumstances and the counts of objectives associated with each named collection. The input/output designation on the Collection List pointer indicates that the pointer is passed in when the routine is called, and the resulting collection list is output to the memory that was allocated and pointed to by that pointer. The last entry in the Collection List has a Null Collection Name. In the illustrated embodiment, the Collection Names is of fixed length, 12 character strings, and the counts of Objectives and Circumstances will be 4 byte integers. Those skilled in the art will observe the opportunity for additional metrics or formats.

| In/Out | Value | Description/Comments |
|---|---|---|
| Input | Rule-Base Name | |
| Output | Description | String |
| Input/Output | Collection List | Pointer to list of Collection Names, Counts of Objectives, and Counts of Circumstances |

(c) Method: Circumstance-Collection.Add

Figure 8:
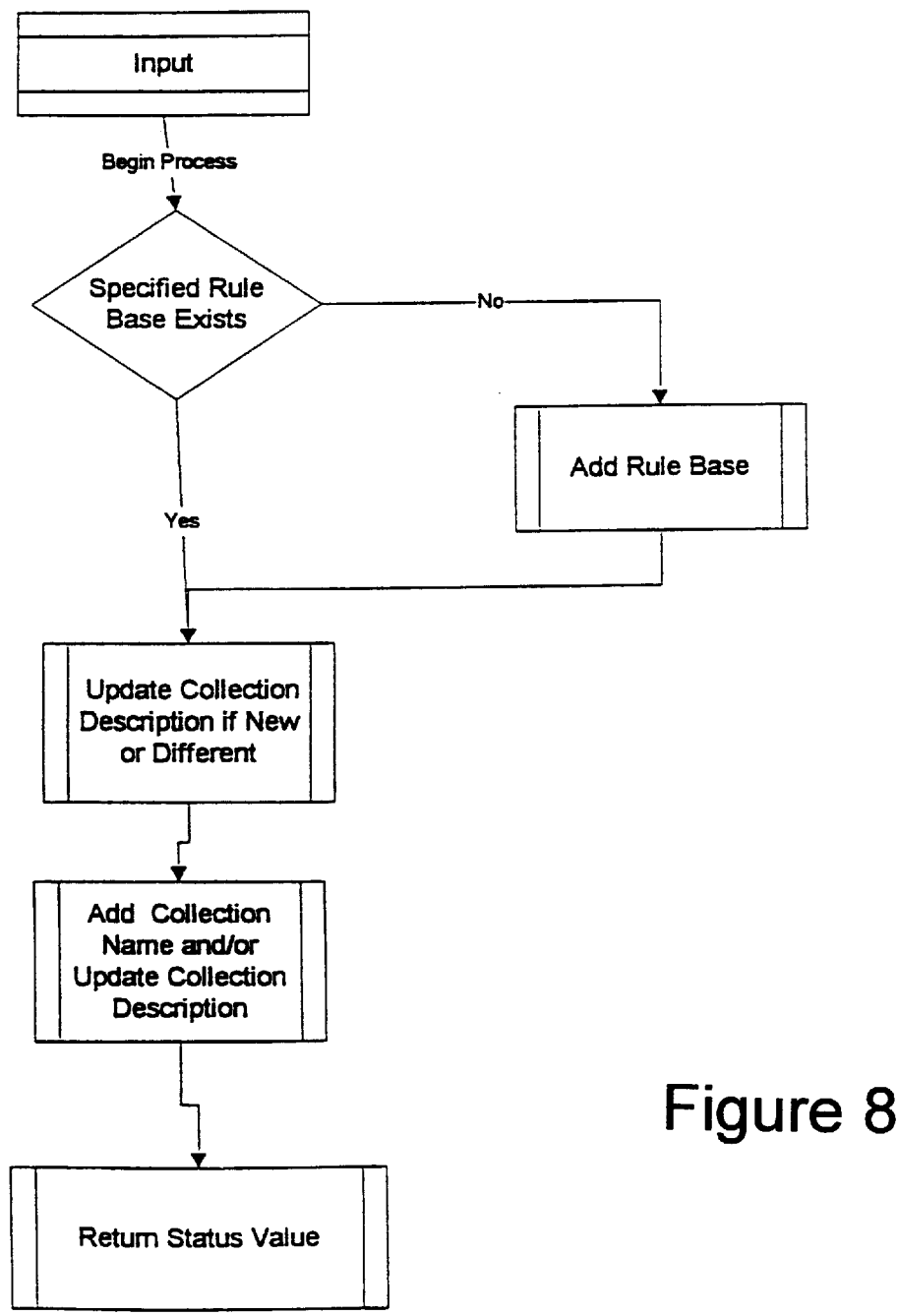
FIGS. 8–11 depict methods for creating, displaying and accessing a rules base according to the invention.

FIG. 8 shows a method to add a collection of Circumstances to a specified Rules Base. In defining the collection, information as to the name of the collection (to be used in subsequent calls to the Rules Base), the description (used for displays of Rules Base information), and the collection type (used to define how the collection will be organized and what form of navigation is preferred to determine ancestors of circumstances within the collection). In this example of the preferred embodiment, the valid collection types are "Hierarchy" and "List". Those skilled in the art will also appreciate that other embodiments of this invention may use alternate data structures or navigation methods to move between circumstances (such as directed graphs) as supported by the particular implementation of the Rule Finder code. The final input of Collection Order allows an integer to be specified providing a relative ordering between collections in the event that a specified objective is associated with circumstances in more than one collection without an explicit order being provided for the navigation between those collections in the Objective definitions.

| In/Out | Value | Description/Comments |
|---|---|---|
| Input | Rule-Base Name | |
| Input | Collection Name | String |
| Input | Collection Description | String |
| Input | Collection Type | String identifying a particular type of Circumstance navigation supported by the Rule Finder code. |
| Input | Collection Order | Integer allowing specification of relative precedence of collections should inheritance require moving across collections and objective-specific information not be available. |

(d) Method: Collection.Display

Figure 10:
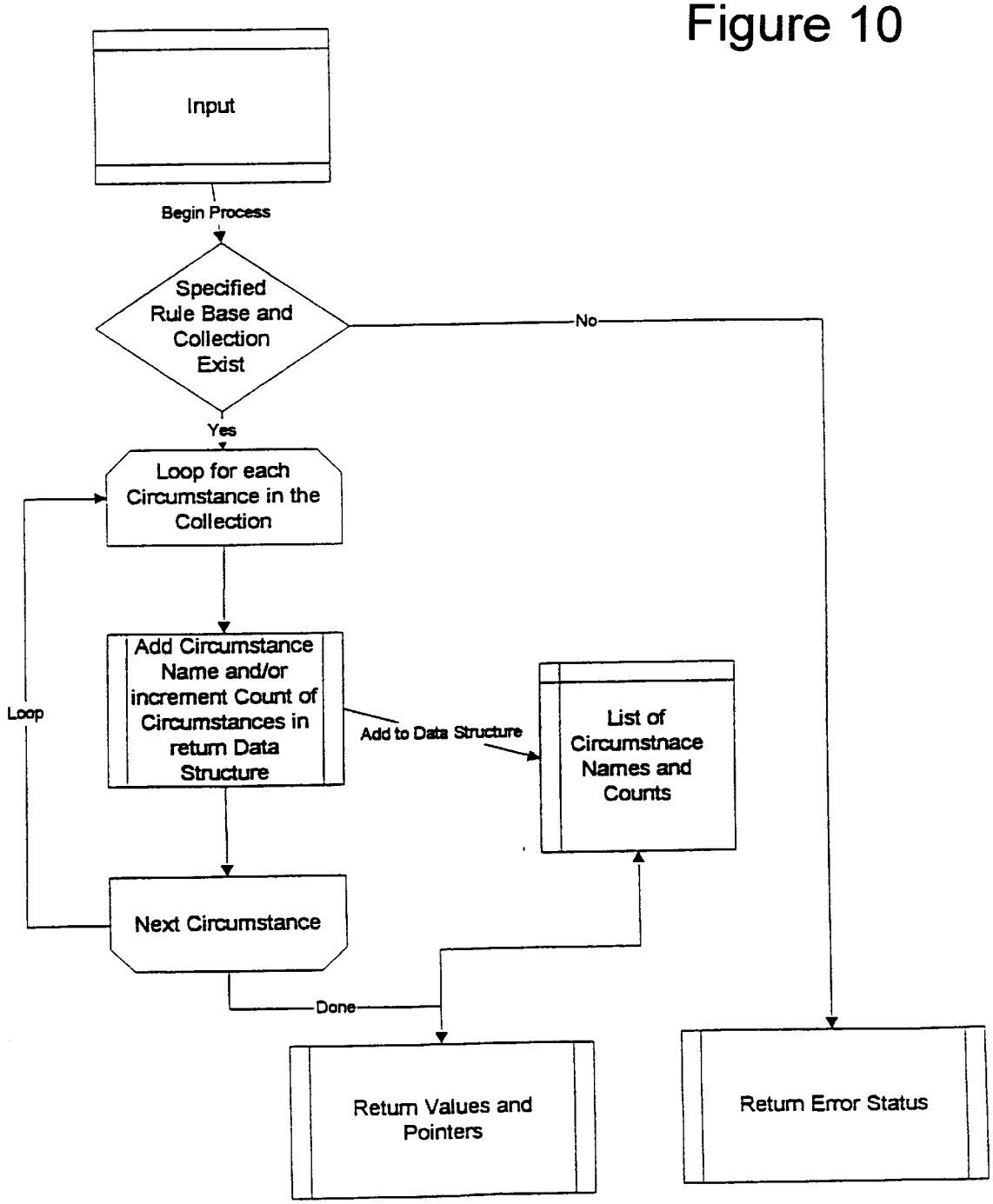
Figure 11:
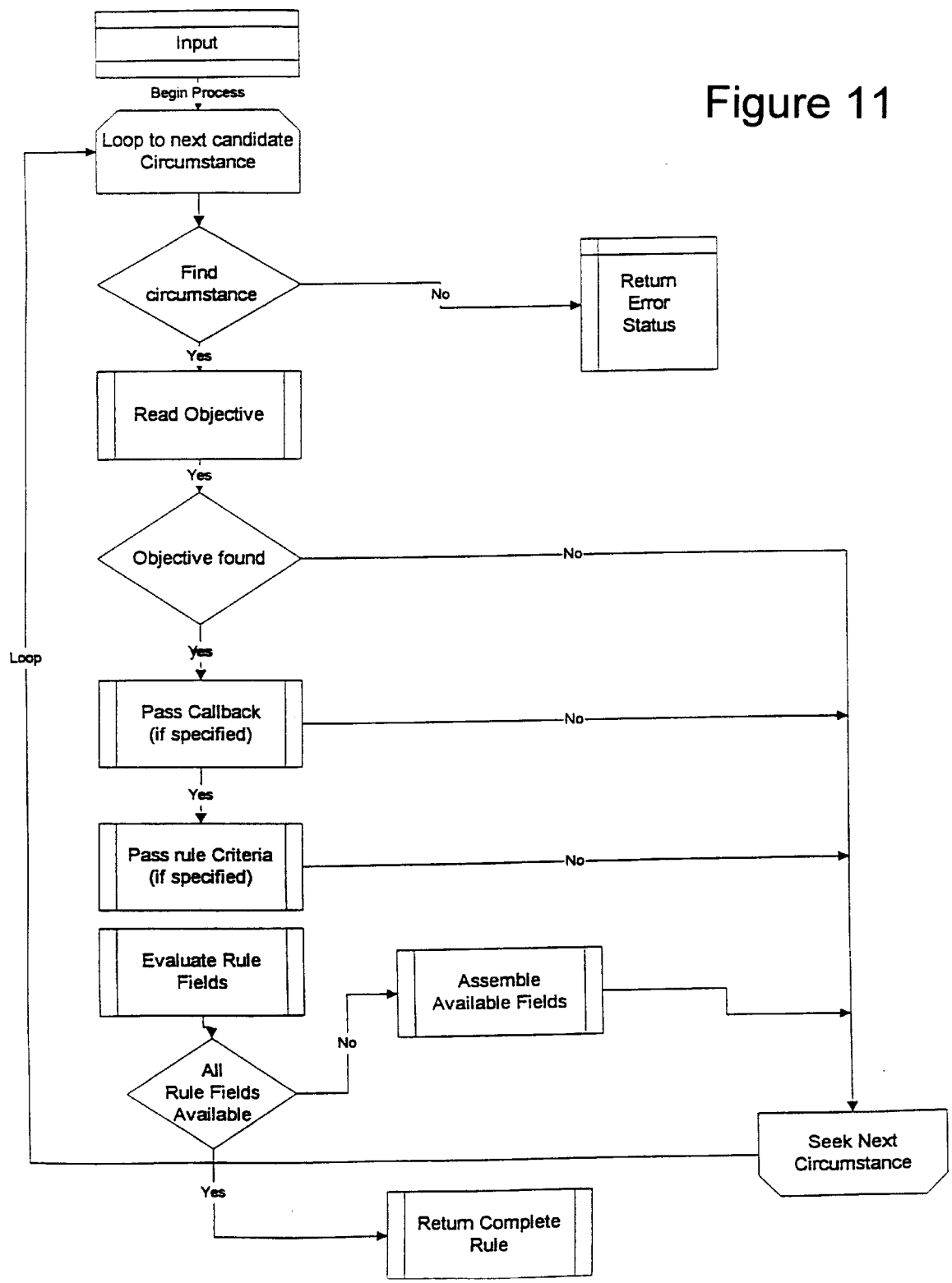

FIG. 10 shows a method used to return information about the Circumstances within a collection. The input of Rules Base Name and Collection Name are used to identify the collection whose information will be returned. The method browses the internal list within the Rules Base that contains the collection and finds the specified entry. The method then returns the Collection Description associated with that Collection Name. It then examines the list of circumstances associated with that collection, and for each entry in the circumstance list it returns the Name, Description and Circumstance Type for each entry as well as the default Circumstance order. The return list is sorted in Circumstance Order, and then Circumstance Name, in the event of duplicate Circumstance orders.

| In/Out | Value | Description/Comments |
|---|---|---|
| Input | Rules Base Name | |
| Input | Collection Name | |
| Input/Output | Collection Description | |
| Input/Output | Circumstance List | Pointer to ordered list of Circumstance Names and Descriptions and Circumstance Type (Identifying the ordering and structure of circumstance list, e.g., Hierarchy, Directed Graph, etc.) and integer Circumstance Order. |

(e) Method: Circumstance.Add

Adds an individual Circumstance to a defined collection within a Rules Base. Input consists of the information needed to add a Circumstance Name to a Collection and to associate it with appropriate ancestor values. Input includes the Rules Base and collection name that are impacted, as well as the Circumstance Name to be added, the description associated with that circumstance to be returned in subsequent interaction and displays, and, of critical importance, the name of the Ancestor Circumstance that will be considered the predecessor just added. The requirements and conventions for Ancestor Circumstance Name are defined by the code and structure referenced in the previously defined Circumstance Type. In the preferred embodiment involving a Hierarchy, an Ancestor Circumstance Name of "$ROOT" indicates that the added node has no predecessors within that particular collection, and is thus a "top level node" of the Hierarchy. In the alternate preferred embodiment of a list, there would be one "$ROOT" Ancestor Circumstance Name, indicating the top most node in the list. In the Hierarchy example, it is feasible to have multiple nodes with "$ROOT" Ancestor Circumstance Names, but in the list implementation it would be only allowable to have a single "$ROOT" (head) Circumstance per collection. Those skilled in the art will recognize that alternate structures and edits will be appropriate for additional implementations and specifications of ancestor and predecessor relationships.

| In/Out | Value | Description/Comments |
|---|---|---|
| Input | Rules Base Name | |
| Input | Collection Name | |
| Input | Circumstance Name | Circumstance Name to add |
| Input | Circumstance Description | |
| Input | Ancestor Circumstance Name | String. Identifies the name of the circumstance that is to be considered the Ancestor in the Hierarchy, Directed Graph, etc. |

This Method edits that indicated item to ensure that there is not circularity in the navigation of the Circumstances.

(f) Method: Rule-Objective-Name.Add

Adds the definition of a Rule Objective to a Rules Base. Would be used prior to the association of a Rule Objective to collections. The contents allow the Rules Base to obtain definitions of where certain pertinent elements of the Rule will be located.

The Objective Name and Description are added to the Rules Base for use in subsequent presentation and display methods, or to act as a Key for access to this particular rule objective. The objective type is used to indicate what types of inheritance are valid for this particular objective name. Two fundamental objective types are a value of 1 which dictates that subsequent processing will be based upon the construction of rules for multiple elements (allowing inheritance on a field by field basis), or a value of 2, which indicates that inheritance is to be allowed only at a rule by rule basis.

In the event that construction is allowed from multiple elements of a rule, additional fields supporting the Rule Objective Structure, the Rule Edit Data Elements are required to provide the rule finder information needed to construct a complete rule across individual records.

The structure also supports information about Rule Edit Data Elements which provides the rule finder with information needed to evaluate whether a rule is valid in deciding if it is eligible to be returned as either an entire entity or as the subset of a rule. The Valid Collections indicates if this Objective Name is to be allowed in circumstances at multiple collections. In the event that multiple collections are allowed (by multiple entries being specified in this list) then this Valid Collections list designates the order that collections are to be traversed if needed to complete the Inheritance operation. As with all parameter lists in this implementation, the list is terminated by an entry whose first value is Null.

| In/Out | Value | Description/Comments |
| --- | --- | --- |
| Input | Rules Base Name | |
| Input | Rule Objective Name | The name of an Objective that will be supported. in this Rules Base. |
| Input | Objective Description | The standard description for this objective. |
| Input | Objective Type | Integer. A Value of 1 indicates this rule may be subject to construction from components through inheritance of elements from ancestor circumstances; if Value = 2 it is always constructed from a integral Rule at a particular circumstance |
| Input | Rule Objective Structure | If Objective Type = 1 (allowing construction across Circumstances) this is a pointer to a list of zero, one or more starting position and ending position pairs that the rule finder will use to identify portions of the designated record that need construction, and a parallel set of starting positions for one byte trigger values (either defined in the above constructed fields or in parallel fields) that will tell the rules base that a particular portion of the rule is subject to construction. |
| Input | Rule Edit Data Elements | An optional pointer to a list of data elements within the rule (identified by name, starting position, ending position and data type) that the calling program may use to indicate that the rule is valid. This is done by having the Rule Finder evaluate an expression referencing these values in determining if a particular rule instance has a valid status. |
| Input | Valid Collections | Pointer to a list of one or more Collections that may contain this Objective. If multiple collections are defined, the order of their specification in this list will define an alternate order of traversal in certain subsequent rule retrieval methods. |
| Input | Next Rule Pointer Position | Position of Next Rule if this Objective supports Next Rule processing. |
| Input | Next Rule Pointer length | Length of Next Rule Pointer allowing the Rule Finder to return the Next Rule value from the rule entry record. |

Those skilled in the art will appreciate that other embodiments of the invention may utilize alternative representations for the above information with variations in representation appropriate to the means of information storage. For example, the alternate means of using a Relational Database to store the rules would allow the Rule Objective Structure and the Rule Edit Data Elements to be specified as a series of Relational Column Names as opposed to the definition of starting and ending positions as defined above.

(g) Method: Rule-Objective-Entry.Add

The addition of a specific Rule Objective in intersection with a particular Circumstance within a Collection creates a new entry in the Rules Base. Editing is performed when the Rule-Objective-Entry is added to ensure that the objective is being added at a Collection Name that was previously defined by the Rule-Objective-Name method.

| In/Out | Value | Description/Comments |
| --- | --- | --- |
| Input | Rules Base Name | |
| Input | Collection Name | |
| Input | Circumstance Name | Circumstance Name to which to add this rule. |
| Input | Rule Objective Name | The name of an Objective that will be added to this Circumstance in the Rules Base. If not specified, the default (or inherited) value for the description will be returned. |
| Input | Objective Description | An optional specialized description for the use of this Rule Objective at this Circumstance. |
| Input | Rule Objective Entry Status | Integer - Value of 0 means that this Rule is not valid at this circumstance and that no further examination of circumstances to find a valid Rule (or rule portion) is to be performed. Value of 1 means that this is a valid Rule at this Circumstance and that the Rule Content should be examined and possibly returned to the calling program. Value of 2 means that this instance of the Rule is to be ignored but that additional Rule Circumstances are to be evaluated to see if a valid Rule may be returned. |

(h) Method: Rule-Validation.Browse

Method to browse a list of entries across the hierarchy to provide a listing of valid Rules. This is particularly useful when the rules are a series of validation entries that are to be presented as a list.

The effect of this processing is to browse across all circumstances for whatever part of the Objective Key is specified and find any valid Objective Names and their descriptions. The method requires as input a starting Objective Partial Key and a starting Circumstance. The method browses all collections (in the order that those collections have been specified relative to any Objective Name encountered) to derive a unique list of full objective names and their circumstances that both match the criteria of being valid completions of the Specified Partial Key as well as being valid based on any other editing information that might be passed into the routine. The Allow Inheritance integer is a Yes/No flag that indicates if the browses objective should be constrained to a single Circumstance. If this is set, then Circumstance ancestors are not evaluated in constructing the list. The output from the method is a list of objective names, objective descriptions and the circumstances at which the objective names were found. In the event that inheritance was allowed, and the valid objectives were compiled from a variety of circumstances, then the initial Circumstance at which that particular Objective Name was found will be returned by the Objective List pointer. Those skilled in the art will recognize numerous alternatives for editing or selecting such records. This sort of display is of particular value in the event that a validation table or other "look up" value is to be used where the user may have a need to select from a list of valid entries (constrained by the circumstance hierarchy and other editing information that might be specified) to make a selection of a valid value from a list.

| In/Out | Value | Description/Comments |
|---|---|---|
| Input | Rules Base Name | |
| Input | Rule Objective Partial Key | Leading position of key to be used for browse |
| Input | Circumstance Name | |
| Input | Allow Inheritance | Integer Yes/No Status Flag |
| Input/Output | Objective List | Pointer to list of Objective names, Objective descriptions, and the initial circumstance, of which they were found. |
| Output | Objective Count | |

(i) Method for Additional Lists and Displays

Additional Methods may be constructed to support the retrieval of information identified by the Rules Base Data Structures in either list or specific detail form. This could include Methods such as an Collection-Objectives display to list all Objectives in use at a particular collection or a Circumstance-Objectives.Display to list all Objectives with records available at a particular Circumstance. These displays can be implemented as simple lists or with additional detail indicated in the Rules Base. Of course, those skilled in the art will appreciate that other embodiments of the invention may utilize a listing that could contain information derived from the existence or absence of information, such as being able to indicate which Objectives at a particular Circumstance will be subject to construction inheritance (as opposed to being retrievable in their entirety at that circumstance).

(j) Methods for Update and Deletion

Parallel Methods will be defined to support the Update, Deletion and other manipulation of the above Rule Entries and supporting data structures.

(k) Method for Recording and Auditing Changes

Every method that adds, deletes or modifies an element of the Rules Base will create a special audit trail record that indicates the Date, Time, User and list of changed values. Methods that display and allow review, reporting and program access to these audit records are provided for each data class with a method name of CLASS.AUDIT, e.g., Objective.Audit.

All data entry methods are be supplemented by parallel methods to delete or update values. Integrity checks (such as relational integrity checks to ensure that updates or deletions of values do not damage or render inaccessible elements of the Rule Base) may be performed at the time of such delete or update method. This would lead to a method being created with a value of "UPDATE" or "DELETE" paralleling each previously specified method (e.g., "CIRCUMSTANCE-COLLECTION.UPDATE" and "CIRCUMSTANCE-COLLECTION.DELETE").

Methods for Rule Retrieval

Definitions for methods for rule retrieval are provided below. As above, although specific sequences of steps are not supplied, those skilled in the art will readily appreciate that the methods can be readily made from the definitions that follow. Values in the tables are required or always returned unless specified in the description/comments section.

(a) Method: GETRULE.INHERIT Retrieve Rule with Inheritance

This is a fundamental method by which a Rule will be returned by the Rule Finder to a calling program as per the criteria associated with the various parameter values below. Based on the Rule Base Name, the Collection Name, the Objective Name and the Starting Circumstance, the Rule Finder will use the Collection Type appropriate to each Collection in which the Objective Name is mentioned to seek a rule that responds to the specified Objective and starting Circumstance. In the event that a specific Collection Name or list of Collection Names is provided, only those Collection Names and appropriate collection types will be used to navigate the Rule Base. The information provided in response to this navigation will both return a particular Rule Entry, a Description that could be a specialization of the basic Description associated with the original definitions of this Rule Objective Name, and navigation information as to the number and construction of circumstances that were navigated. Navigation for this and subsequent rule retrieval methods will be as per the general structure of Diagram 7. Those skilled in the art will recognize the possibility of other statistical or navigation information being returned as well as alternate formats or structures by which evaluation criteria could be passed in to or information returned from the Rule Finder.

| In/Out | Value | Description/Comments |
|---|---|---|
| Input | Rules Base Name | |
| Input | Collection Name | Optional - if specified, it limits the search to the named Collection or Collections of Circumstances. If not specified, it examines all Circumstances in which this Objective Exists. |
| Input | Rule Objective Name | The name of an Objective that will added to this Circumstance in the Rules Base. |
| Input | Starting Circumstance | The name of the Starting Circumstance to be used in initiating the search and traversal of the Rules Base. May be an ordered list of starting circumstances if the calling program wishes to enable the Rule Finder to examine additional circumstance names should an initial one not generate a valid rule entry or appear in the Circumstance Collection. |
| Output | Initial Found Circumstance | The Circumstance at which (at least a starting portion of) this rule was found. This and all subsequent output values are only returned if the Method's Return Status is "Success". |
| Output | Circumstances Construction Count | The number of Rules that were used in creating the Rule. If the entire Rule derived from a single rule, this value will be 1. |
| Output | Circumstances Navigation Count | The number of Rules that were examined in creating the Rule. If the entire Rule derived from a single rule that was four at the Starting Circumstance, this value will be 1. |
| Output | Objective Description | Returns the specialized description for the use of this Rule Objective at this Circumstance. |
| Input/Output | Rule Instance Pointer | The pointer to the returned rule. |

(b) Method: GETRULE.INHERIT-CONDITIONS Retrieve Rule with Inheritance and Conditions Identifies the Search for a Rule using the Inheritance features of the Rule Finder, but subjecting each Rule to additional examination before considering it valid for use in selection or inheritance operations. Should one of these conditions fail, the Rule is considered to not suitable for inheritance, and the rule finder will proceed to the next applicable circumstance.

| In/Out | Value | Description/Comments |
|---|---|---|
| Input | Rules Base Name | |
| Input | Collection Name | Optional - if specified, it limits the search to the named Collection of Circumstances. If not specified, it |

-continued

| In/Out | Value | Description/Comments |
|---|---|---|
| | | examines a Circumstances in which this Objective Exists. |
| Input | Rule Objective Name | The name of an Objective that will added to this Circumstance in the Rules Base. |
| Input | Starting Circumstance | The name of the Starting Circumstance to be used in initiating the search and traversal of the Rules Base. |
| Input | Condition to Evaluate | Optional pointer to one or more condition expressions (that may access data elements defined in the Rule Objective Name definition) to be to be called before the Rule Finder determines if it is eligible for return or use in the inheritance process. Evaluation of the Condition may result in an interactive query to an end-user, another system, a database, or another rules base. |
| Input | Callback Routine | Optional Name of a Subroutine to be called (with a pointer to the Rule being evaluated) to have program specific examination of the Rule before the Rule Finder determines if it is eligible for return or use in the inheritance process. Each callback returns to the Rule Finder a Status Flag that indicates if a failure of the condition should suspend further Inheritance, or if Inheritance should be continued. |
| Output | Initial Found Circumstance | The Circumstance at which (at least a starting portion of) this rule was found. This and all subsequent output values are only returned if the Method's Return Status is "Success". |
| Output | Circumstances Construction Count | The number of Rules that were used in creating the Rule. If the entire Rule derived from a single rule, this value will be 1. |
| Output | Circumstances Navigation Count | The number of Rules that were examined in creating the Rule. If the entire Rule derived from a single rule that was found at the Starting Circumstance;, this value will be 1. |
| Output | Condition Rejection Count | Number of times that either the Condition Check or the Callback routine disqualified a rule record from consideration. |
| Output | Objective Description | Returns the specialized description for the use of this Rule Objective at this Circumstance. |
| Input/ Output | Rule Instance Pointer | The pointer to the returned rule. |

(c) Method: GENTRULE.SPECIFIC Retrieve of a Specific key

Identifies the Search for a Rule without using the Inheritance features of the Rule Finder 32.

| In/Out | Value | Description/Comments |
|---|---|---|
| Input | Rules Base Name | |
| Input | Collection Name | Optional. |
| Input | Rule Objective Name | Name of the Objective being sought. |
| Input | Circumstance | The name of the particular Circumstance to be returned. |
| Output | Rule Validity | Integer value of 1 if the Rule is considered "valid"; value of zero if the rule has elements that would require inheritance to attempt to resolve (in which case the Method Return Status win also be set to "Problem)". |
| Output | Objective Description | Returns the specialized description for the use of this Rule Objective at this Circumstance. |
| Input/ Output | Rule Instance Pointer | The pointer to the returned rule. |

(d) Method: GETRULE-NEXT.INHERIT-CONDITIONS Retrieve next Rule in series with inheritance and conditions Identifies the Search for a Rule entry using the Inheritance features of the Rule Finder across circumstances, but also using the feature of the Rules Base which allows Objectives to be linked sequentially in the Rules Base (so that a "next step" can be defined). This "next Rule" feature allows a series of rules to be iterative returned, by having the calling program provide the Rule Finder with a "Previous Rule" and having it use the linkage defined in the Rule Objective Name to define a connection to the "Current/Next Rule". Also subjects each Rule to additional examination before considering it valid for use in selection or inheritance operations. Should one of these conditions fail, the Rule is considered to not be a candidate for use, and inheritance will continue at the next applicable circumstance.

| In/Out | Value | Description/Comments |
|---|---|---|
| Input | Rules Base Name | |
| Input | Collection Name | Optional - if specified, it limits the search to a particular Collection of Circumstances. If not specified, it examines all Circumstances in which this Objective Exists. |
| Input | Rule Objective Name | Name of the Objective being sought. |
| Input | Starting Circumstance | The name of the Starting Circumstance to be used in initiating the search and traversal of the Rules Base. |
| Input | Condition to Evaluate | Optional pointer to one or more condition expressions (that access data elements defined in the Rule Objective Name definition) to be to be called before the Rule Finder determines if it is eligible for return or use in the inheritance process. |
| Input | Callback Routine | Optional Name of a Subroutine to be called (with a pointer to the Rule being evaluated) to have program specific examination of the Rule before the Rule Finder determines if it is eligible for return or use in the inheritance process. Each callback returns to the Rule Finder a Status Flag that indicates either that the rule qualifies for use, or is unqualified if the failure of the callback should suspend further Inheritance, or if Inheritance should be continued. |
| Output | Initial Found Circumstance | The Circumstance at which (at least a starting portion of) this rule was found. This and all subsequent output values are only returned if the Method's Return Status is "Success". |
| Output | Circumstances Construction Count | The number of Rules that were used in creating the Rule. If the entire Rule derived from a single rule, this value will be 1. |
| Output | Circumstances Navigation Count | The number of Rules that were examined in creating the Rule. If the entire Rule derived from a single rule that was found at the Starting Circumstance, this value will be 1. |
| Output | Condition Failure Count | Number of times that either the Condition Check or the Callback |

| In/Out | Value | Description/Comments |
|---|---|---|
| | | routine disqualified a rule record from consideration. |
| Input | Rule Objective Found | Name of the Objective being returned. |
| Output | Objective Description | Returns the specialized description for the use of this Rule Objective at this Circumstance. |
| Input/ Output | Rule Instance Pointer | The pointer to the returned rule. |

With regard to the Conditions and the Callback capabilities, the calling routine is able to specify Conditions to Evaluate on each call to the Rules Base or use varying criteria in performing its evaluation during the Callback. Thus, the rule qualification process can vary in accordance to specific information regarding the work in process.

Described above are a rules base and method for accessing the same meeting the objects set forth herein. Those skilled in the art will appreciate that the illustrated and described embodiments are illustrative and that further embodiments incorporating the principles hereof fall within the scope of the invention. In view thereof,

What is claimed is:

1. A method of determining a rule for a designated objective and circumstance, the method comprising the steps of
   A. any of creating and accessing a rules base that includes
      i. a plurality of rule entries, each associated with an objective and with a circumstance, at least one of which entries has a status indicating that information associated with the entry corresponds to one or more rules for that objective and circumstance, and at least another of which entries has a status indicating that one or more rules for that objective and circumstance should be sought elsewhere,
      ii. a structure that defines an ancestral relationship of circumstances,
   B. responding to existence of an entry in the rules base associated with the designated objective and circumstance, which entry has a status indicating that information associated with the entry corresponds to one or more rules for that objective and circumstance, for generating those rules based on information associated with that entry,
   C. responding to any of
      i. absence of an entry in the rules base associated with the designated objective and circumstance, and
      ii. an entry in the rules base associated with the designated objective and circumstance, which entry has a status indicating that one or more rules for that objective and circumstance should be sought elsewhere, for generating those rules based on information associated with an entry that is associated with the designated objective and with a circumstance that is any of an immediate or prior ancestor of the designated circumstance.

2. A method according to claim 1, wherein step (B) includes the step of searching the rules base for an entry, if any, associated with the designated objective and circumstance.

3. A method according to claim 1, wherein step (C) includes the steps of responding to any of
   absence of an entry in the rules base associated with the designated objective and circumstance, and
   an entry in the rules base associated with the designated objective and circumstance, which entry has a status indicating that one or more rules for that objective and circumstance should be sought elsewhere,
for (i) determining, from the structure, an immediate ancestor of the designated circumstance, that immediate ancestor being termed a first ancestor circumstance, (ii) searching the rules base for an entry, if any, associated with the designated objective and with that first ancestor circumstance.

4. A method according to claim 3, wherein step (C) includes the steps of responding to any of
   absence of an entry in the rules base associated with the designated objective and the first ancestor circumstance, and
   an entry in the rules base associated with the designated objective and the first ancestor circumstance, which entry has a status indicating that one or more rules for that objective and circumstance should be sought elsewhere,
for (i) determining, from the structure, an immediate ancestor to the first ancestor circumstance, that immediate ancestor being termed a second ancestor circumstance, and (ii) searching the rules base for an entry, if any, associated with the designated objective and with that second ancestor circumstance.

5. A method according to claim 4, wherein step (C) includes the step of responding to any of
   absence of an entry in the rules base associated with the designated objective and the second ancestor circumstance, and
   an entry in the rules base associated with the designated objective and the second ancestor circumstance, which entry has a status indicating that one or more rules for that objective and circumstance should be sought elsewhere,
for (i) determining, from the structure, a third or subsequent ancestor circumstance, (ii) searching in the rules base for an entry, if any, associated with the designated objective and that third or subsequent ancestor circumstance, and (iii) generating those rules based on information associated with one or more entries associated with the designated objective and with the third or subsequent ancestor circumstance.

6. A method according to claim 1, wherein
   step (A) includes the step of accessing a rules base that comprises multiple rule collections, each defining an ancestral relationship of circumstances for a respective set of one or more objectives, and
   step (C) includes the step of determining an immediate or prior ancestor of the designated circumstance from the collection for the designated objective, or moving in an ordered fashion between collections if a designated objective appears in more than one collection of circumstances.

7. A method according to claim 1, wherein
   step (A) includes the step of accessing a rules base in which at least one entry has a characteristic identifying a condition necessary to determine whether information associated with that entry or with another entry corresponds to one or more rules for the associated objective and circumstance,
   step (B) includes the additional step of determining whether the condition is satisfied before generating those rules based on information associated with an entry associated with the designated objective and circumstance, and
   step (C) includes the additional step of responding to failure of satisfaction of the condition for generating those rules based on information associated with one or more entries associated with the designated objective and with a circumstance that is any of an immediate or prior ancestor of the designated circumstance.

8. A method according to claim 7, wherein step (B) includes the step of involving a call-back software module to obtain information necessary to determine whether the condition is satisfied.

9. A method according to claim 8, wherein step (B) includes the step of querying any of an operator, another system, a database, and another rule base for information necessary to determine whether the condition is satisfied.

10. A method according to claim 1, comprising the steps of
generating a request in an applications program software module for determination of a rule for a designated objective and circumstance, and
responding to that request with a rule finder software module that executes steps (A)–(C).

11. A method according to claim 1, including the step of generating, in an SQL format, the request for determination of a rule for an objective and circumstance.

12. A method according to claim 1, wherein
step (A) includes the step of accessing a rules base in which at least one entry is associated with a multipart objective,
step (B) includes responding to existence of an entry in the rules base associated with the designated objective and circumstance, which entry has a status indicating that information associated with the entry corresponds to one or more rules for the associated objective and circumstance, for generating, based on information associated with that entry, a next objective candidate rule key for use in defining a subsequent objective for which one or more rules is to be determined,
step (C) includes responding to any of
(i) absence of an entry in the rules base associated with the designated objective and circumstance, and
(ii) an entry in the rules base associated with the designated objective and circumstance, which entry has a status indicating that one or more rules for that objective and circumstance should be sought elsewhere,
for generating, based on information associated with an entry associated with the designated objective and with a circumstance that is any of an immediate or prior ancestor of the designated circumstance, a next objective candidate rule key for use in defining a subsequent objective for which one or more rules are to be determined.

13. A method according to claim 1, wherein
step (A) includes the step of accessing a rules base in which at least one of the entries has a status indicating that the associated objective and circumstance are invalid, and
step (B) includes the step of responding to existence of an entry in the rules base associated with the designated objective and circumstance, which entry has a status indicating that the associated objective and circumstance are invalid for generating any of a message and a return status reflective thereof.

14. A method according to claim 1, wherein
step (A) further includes the step of accessing a rules base in which at least one entry is associated with multiple statuses and with multiple corresponding rule elements for the objective and circumstance associated with that entry, each status indicating any of (i) that information corresponding to the respective rule element is associated with that element, and (ii) that the respective rule should be sought elsewhere,
step (B) includes the step of responding to existence of an entry in the rules base associated with the designated objective and circumstance, which entry has one or more statuses indicating that information corresponding to one or more respective rule elements is associated with that element, for generating rules corresponding to those statuses from information associated with that element, and
step (C) includes the step of responding to existence of an entry in the rules base associated with the designated objective and circumstance, which entry has one or more statuses indicating that the respective rule elements should be sought elsewhere, for generating rules corresponding to those statuses from information associated with one or more entries that are associated with the designated objective and with a circumstance that is any of an immediate or prior ancestor of the designated circumstance.

15. A method according to claim 1 for validating designated information, comprising the step of comparing such designated information with the rule generated in any of steps (B) and (C).

16. A method according to claim 1, wherein
step (A) includes the step of accessing a rules base storing information indicating a structure of the rule base, that information including whether each of one or more entries are any of (i) associated with a characteristic identifying a condition necessary to determine whether information associated with that entry or with another entry corresponds to the rule for the associated objective and circumstance, (ii) associated with a multipart objective, (iii) associated with a next objective candidate rule key for use in defining a subsequent objective for which a rule is to be determined, (iv) associated with any of multiple rules or statuses.

17. A method of determining a sequence of rules for a designated objective, rule identifier and circumstance, the method comprising
A. accessing a rules base that includes
i. a plurality of entries, each associated with an objective, a current rule identifier and a circumstance, at least one of which entries has a status indicating that information associated with the entry corresponds to a rule for that objective, current rule identifier and circumstance, and at least another of which entries has a status indicating that the rule for that objective, current rule identifier and circumstance corresponds to information associated with an another entry,
ii. a structure that defines an ancestral relationship of circumstances,
B. responding to existence of an entry in the rules base associated with the designated objective, current rule identifier, and circumstance, which entry has a status indicating that information associated with the entry corresponds to the rule for that objective, current rule identifier and circumstance, for generating a rule in the sequence based on information in that entry and for at least one of (i) storing and (ii) generating an identifier for a next rule in the sequence, and
C. responding to any of
(i) absence of an entry in the rules base associated with the designated objective, current rule identifier and circumstance, and (ii) an entry in the rules base associated with the designated objective, rule identifier and circumstance, which entry has a status indicating that the rule for the associated objective, current rule identifier and circumstance should be sought elsewhere, for generating a rule in the sequence based on information associated with an entry that is associated with the designated objective, current rule identifier and with a circumstance that is any of an immediate or prior ancestor of the designated circumstance, and for at least one of (i) storing and (ii) generating an identifier of a next rule in the sequence.

18. A method according to claim 17, wherein step (B) includes the step of searching the rules base for an entry, if any, associated with the designated objective, current rule identifier and circumstance.

19. A method according to claim 17, wherein step (C) includes the steps of responding to any of absence of an entry in the rules base associated with the designated objective, current rule identifier and circumstance, and an entry in the rules base associated with the designated objective, current rule identifier and circumstance, which entry has a status indicating that the rule for that objective, current rule identifier and circumstance should be sought elsewhere, for (i) determining, from the structure, an immediate ancestor of the designated circumstance, that immediate ancestor being termed a first ancestor circumstance, (ii) searching in the rules base for an entry, if any, associated with the designated objective, current rule identifier, and with that first ancestor circumstance.

20. A method according to claim 19, wherein step (C) includes the steps of responding to any of absence of an entry in the rules base associated with the designated objective, current rule identifier, and the first ancestor circumstance, and an entry in the rules base associated with the designated objective, current rule identifier, and the first ancestor circumstance, which entry has a status indicating that the rule for that objective, current rule identifier, and circumstance should be sought elsewhere, for (i) determining, from the structure, an immediate ancestor to the first ancestor circumstance, that immediate ancestor being termed a second ancestor circumstance, and (ii) searching in the rules base for an entry, if any, associated with the designated objective, current rule identifier, and with that second ancestor circumstance.

21. A method according to claim 20, wherein step (C) includes the step of responding to any of absence of an entry in the rules base associated with the designated objective, current rule identifier, and the second ancestor circumstance, and an entry in the rules base associated with the designated objective, current rule identifier, and the second ancestor circumstance, which entry has a status indicating that the rule for that objective, current rule identifier, and circumstance should be sought elsewhere, for (i) determining, from the structure, a third or subsequent ancestor circumstance, (ii) searching in the rules base for an entry, if any, associated with the designated objective, current rule identifier, and that third or subsequent ancestor circumstance, and (iii) generating a rule in the sequence based on information associated with an entry associated with the designated objective and with the third or subsequent ancestor circumstance, and at least one of (i) storing and (ii) generating an identifier for a next rule in the sequence.

22. A method according to claim 17, wherein step (B) includes the step of invoking a call-back software module to obtain information necessary to determine whether the condition is satisfied.

23. A method according to claim 22 wherein step (B) includes the step of querying any of an operator, another system, a database, and another rule base for information necessary to determine whether the condition is satisfied.

24. A method according to claim 17 comprising the steps of generating a request in an applications program software module for determination of a rule for a designated objective and circumstance, and responding to that request with a rule finder software module that executes steps (A)–(C).

25. A method according to claim 24 wherein steps (B)–(C) includes the step of responding to a first request from the applications program software module for determination of a rule for a designated objective and circumstance for generating a rule in the sequence for the designated objective, a first rule identifier and the designated circumstance, and for storing a next rule identifier, and steps (B)–(C) includes the step of responding to a subsequent request from the applications program software module for determination of a rule for a designated objective and circumstance for generating a rule in the sequence for the designated objective, the next rule identifier, and the designated circumstance.

26. A method according to claim 17, including the step of generating, in the SQL format, the request for determination of a rule for a designated objective and circumstance.

27. A method according to claim 17, wherein step (A) includes the step of accessing a rules base in which at least one of the entries has a status indicating that the associated objective, current rule identifier and circumstance are invalid, and step (B) includes the step of responding to existence of an entry in the rules base associated with the designated objective, current rule identifier and circumstance, which entry has a status indicating that the associated objective and circumstance are invalid for generating any of a message and a return status reflective thereof.

28. A method according to claim 17, wherein step (A) further includes the step of accessing a rules base in which at least one entry is associated with multiple statuses and with multiple corresponding rules for the objective, current rule identifier and circumstance associated with that entry, each status indicating any of (i) that information corresponding to the respective rule is associated with the entry, and (ii) that the respective rule should be sought elsewhere, step (B) includes the step of responding to existence of an entry in the rules base associated with the designated objective, current rule identifier and circumstance, which entry has one or more statuses indicating that information corresponding to one or more respective rules is associated with the entry, for generating rules corresponding to those statuses from information associated with the entry, and step (C) includes the step of responding to existence of an entry in the rules base associated with the designated objective, current rule identifier and circumstance, which entry has one or more statuses indicating that the respective rules should be sought elsewhere, for generating rules corresponding to those statuses from information associated with one or more entries that are associated with the designated objective and with a circumstance that is any of an immediate or prior ancestor of the designated circumstance.

29. A method according to claim 17 wherein step (A) includes the step of accessing a rules base storing information indicating a structure of the rules base, that information including whether each of one or more entries are any of (i) associated with a characteristic identifying a condition necessary to determine whether information associated with that entry or with another entry corresponds to the rule for the associated objective and circumstance, (ii) associated with a multipart objective, (iii) associated with a next objective candidate rule key for use in defining a subsequent objective for which a rule is to be determined, (iv) associated with any of multiple rules or statuses.

30. A method of determining a rule for a designated objective and circumstance, the method comprising the steps of A. accessing a rules base that includes (i) a plurality of entries, each associated with an objective and with a circumstance, and (ii) a structure defining an ancestral relationship of circumstances, B. responding to existence of an entry in the rules base associated with the designated objective and circumstance for generating a rule based on information associated with that entry, and C. responding to an absence of an entry in the rules base associated with the designated objective and circumstance for generating a rule based on information associated with an entry associated with the designated objective and with a circumstance that is any of an immediate or prior ancestor of the designated circumstance.

31. A method according to claim 30, wherein step (B) includes the step of searching the rules base for an entry, if any, associated with the designated objective and circumstance.

32. A method according to claim 30, wherein step (C) includes the steps of (i) responding to an absence of an entry in the rules base associated with the designated objective and circumstance determining from the structure an immediate ancestor of the designated circumstance, that immediate ancestor being termed a first ancestor circumstance, (ii) searching the rules base for an entry, if any, associated with the designated objective and that first ancestor circumstance.

33. A method according to claim 32, wherein step (C) includes the step of responding to an absence of an entry in the rules base associated with the designated objective and the first ancestor circumstance for (i) determining from the structure an immediate ancestor to the first ancestor circumstance, that immediate ancestor being termed a second ancestor circumstance, and (ii) searching in the rules base for an entry, if any, associated with the designated objective and that second ancestor circumstance.

34. A method according to claim 33, wherein step (C) includes the step of responding to an absence of an entry in the rules base associated with the designated objective and the second ancestor circumstance for (i) determining from the structure a third or subsequent ancestor circumstance, (ii) searching in the rules base for an entry, if any, associated with the designated objective and that third or subsequent ancestor circumstance, and (iii) generating a rule based on information associated with an entry associated with the designated objective and with that third or subsequent ancestor circumstance.

35. A method according to claim 30, wherein step (A) includes the step of accessing a rules base wherein, additionally, at least one of which entries has a status indicating that the rule for the associated objective and circumstance corresponds to information associated with an another entry.

36. A method according to claim 30, wherein step (B) includes responding to existence of an entry in the rules base associated with the designated objective and circumstance, which entry has a status indicating that the rule for that objective and circumstance should be sought elsewhere, for generating a rule based on information associated with an entry associated with the designated objective and with a circumstance that is any of an immediate or prior ancestor of the designated circumstance.

37. A method according to claim 30, wherein step (A) includes the step of accessing a rules base that comprises multiple structures, each defining an ancestral relationship of circumstances for a respective set of one or more objectives, and step (C) includes the step of determining an immediate or prior ancestor of the designated circumstance from one or more collections for the designated objective.

38. A method according to claim 30, wherein step (A) includes the step of accessing a rules base in which at least one entry has a characteristic identifying a condition necessary to determine whether information associated with that entry or with another entry corresponds to the rule for the associated objective and circumstance, step (B) includes the additional step of determining whether the condition is satisfied before generating a rule based on information associated with an entry associated with the designated objective and circumstance, and step (C) includes the additional step of responding to failure of satisfaction of the condition for generating a rule based on information associated with an entry associated with the designated objective and with a circumstance that is any of an immediate or prior ancestor of the designated circumstance.

39. A method according to claim 38, wherein step (B) includes the step of invoking a call-back software module to obtain information necessary to determine whether the condition is satisfied.

40. A method according to claim 39, wherein step (B) includes the step of querying any of an operator, another system, a database, and another rule base for information necessary to determine whether the condition is satisfied.

41. A method according to claim 30, comprising the steps of generating a request in an applications program software module for determination of a rule for a designated objective and circumstance, and responding to that request with a rule finder software module that executes steps (A)–(C).

42. A method according to claim 41, including the step of generating, in an SQL format, the request for determination of a rule for a designated objective.

43. A method according to claim 30, wherein step (A) includes the step of accessing a rules base in which at least one entry is associated with a multipart objective, step (B) includes responding to existence of an entry in the rules base associated with the designated objective and circumstance, which entry has a status indicating that information associated with the entry corresponds to the rule for the associated objective and circumstance, for generating, based on information associated with that entry, a next objective candidate rule key for use in defining a subsequent objective for which a rule is to be determined, step (C) includes responding to absence of an entry in the rules base associated with the designated objective and circumstance for generating, based on information associated with an entry associated with the designated objective and with a circumstance that is any of an immediate or prior ancestor of the designated circumstance, a next objective candidate rule key for use in defining a subsequent objective for which a rule is to be determined.

44. A method according to claim 30, wherein step (A) includes the step of accessing a rules base in which at least one of the entries has a status indicating that the associated objective and circumstance are invalid, and step (B) includes the step of responding to existence of an entry in the rules base associated with the designated objective and circumstance, which entry has a status indicating that the associated objective and circumstance are invalid for generating any of a message and a return status reflective thereof.

45. A method according to claim 30 for validating designated information as a factor in determining the applicability of the rule, comprising the step of comparing such designated information with the rule generated in any of steps (B) and (C).

46. A method according to claim 30, wherein step (A) includes the step of accessing a rules base storing information indicating a structure of the rules base, that information including whether each of one or more entries are any of (i) associated with a characteristic identifying a condition necessary to determine whether information associated with that entry or with another entry corresponds to the rule for the associated objective and circumstance, (ii) associated with a multipart objective, (iii) associated with a next objective candidate rule key for use in defining a subsequent objective for which a rule is to be determined, (iv) associated with any of multiple rules or statuses.

47. A method of determining a rule for a designated objective and circumstance, the method comprising the steps of A. accessing a rules base that includes
   i. a plurality of entries, each associated with an objective and with a circumstance at least one of which entries has a status indicating that information associated with the entry corresponds to the rule for the associated objective and circumstance, and at least another of which entries has a status indicating that the rule for that objective and circumstance corresponds to information associated with an another entry,
   ii. a structure that defines an ancestral relationship of circumstances, B. responding to existence of an entry in the rules base associated with the designated objective and circumstance, which entry has a status indicating that information associated with the entry corresponds to the rule for that objective and circumstance, for generating a rule based on information associated with that entry, C. responding to existence of an entry in the rules base associated with the designated objective and circumstance, which entry has a status indicating that information for the associated objective and circumstance should be sought elsewhere, for generating a rule based on information associated with an entry that is associated with the designated objective and with a circumstance that is any of an immediate or prior ancestor of the designated circumstance.

48. A method according to claim 47, wherein step (B) includes the step of searching the rules base for an entry, if any, associated with the designated objective and circumstance.

49. A method according to claim 47, wherein step (C) includes the steps of responding to existence of an entry in the rules base associated with the designated objective and circumstance, which entry has a status indicating that information for the associated objective and circumstance should be sought elsewhere, for (i) determining, from the structure, an immediate ancestor of the designated circumstance, that immediate ancestor being termed a first ancestor circumstance, (ii) searching in the rules base for an entry, if any, associated with the designated objective and that first ancestor circumstance.

50. A method according to claim 49, wherein step (C) includes the steps of responding to existence of an entry in the rules base associated with the designated objective and the first ancestor circumstance, which entry has a status indicating that the rule for that objective and circumstance should be sought elsewhere, for (i) determining from the structure an immediate ancestor to the first ancestor circumstance, that immediate ancestor being termed a second ancestor circumstance, and (ii) searching the rules base for an entry, if any, associated with the designated objective and that second ancestor circumstance.

51. A method according to claim 50, wherein step (C) includes the step of responding to existence of an entry in the rules base associated with the designated objective and the second circumstance, which entry has a status indicating that the rule for that objective and circumstance corresponds associated with another entry, for (i) determining from the structure a third or subsequent ancestor circumstance, (ii) searching the rules base for an entry, if any, associated with the designated objective and that third or subsequent ancestor circumstance, and (iii) generating a rule based on information associated with an entry associated with the designated objective and with that third or subsequent ancestor circumstance.

52. A method according to claim 47, wherein step (B) includes the step of responding to an absence of an entry in the rules base associated with the designated objective and circumstance for generating a rule based on information associated with an entry associated with the designated objective and with a circumstance that is any of an immediate or prior ancestor of the designated circumstance.

53. A method according to claim 47, wherein step (A) includes the step of accessing a rules base that comprises multiple structures, each defining an ancestral relationship of circumstances for a respective set of one or more objectives, and step (C) includes the step of determining an immediate or prior ancestor of the designated circumstance from the structure for the designated objective.

54. A method according to claim 47, wherein step (A) includes the step of accessing a rules base in which at least one entry has a characteristic identifying a condition necessary to determine whether information associated with that entry or with another entry corresponds to the rule for the associated objective and circumstance, step (B) includes the additional step of determining whether the condition is satisfied before generating a rule based on information associated with an entry associated with the designated objective and circumstance, and step (C) includes the additional step of responding to failure of satisfaction of the condition for generating a rule based on information associated with an entry associated with the designated objective and with a circumstance that is any of an immediate or prior ancestor of the designated circumstance.

55. A method according to claim 54, wherein step (B) includes the step of invoking a call-back software module to obtain information necessary to determine whether the condition is satisfied.

56. A method according to claim 55, wherein step (B) includes the step of querying any of an operator, another system, a database and a rule base for information necessary to determine whether the condition is satisfied.

57. A method according to claim 47, comprising the steps of generating a request in an applications program software module for determination of a rule for a designated objective and circumstance, and responding to that request with a rule finder software module that executes steps (A)–(C).

58. A method according to claim 47, including the step of generating, in an SQL format, the request for determination of a rule for a designated objective.

59. A method according to claim 47, wherein step (A) includes the step of accessing a rules base in which at least one entry is associated with a multipart objective, step (B) includes responding to existence of an entry in the rules base associated with the designated objective and circumstance, which entry has a status indicating that information associated with the entry corresponds to the rule for the associated objective and circumstance, for generating a part of a next objective for which a rule is to be determined in the database based on information associated with that entry, step (C) includes responding to existence of an entry in the rules base associated with the designated objective and circumstance, which entry has a status indicating that the rule for that objective and circumstance should be sought elsewhere for generating a part of a next objective for which a rule is to be determined in the database based on information associated with an entry associated with the designated objective and with a circumstance that is any of an immediate or prior ancestor of the designated circumstance.

60. A method according to claim 47, wherein step (A) includes the step of accessing a rules base in which at least one of the entries has a status indicating that the associated objective and circumstance are invalid, and step (B) includes the step of responding to existence of an entry in the rules base associated with the designated objective and circumstance, which entry has a status indicating that the associated objective and circumstance are invalid for generating any of a message and a return status reflective thereof.

61. A method according to claim 47, wherein step (A) further includes the step of accessing a rules base in which at least one entry is associated with multiple statuses and with multiple corresponding rule elements for the objective and circumstance associated with that entry, each status indicating any of (i) that information corresponding to the respective rule element is associated with that element, and (ii) that the respective rule element should be sought elsewhere, step (B) includes the step of responding to existence of an entry in the rules base associated with the designated objective and circumstance, which entry has one or more statuses indicating that information corresponding to one or more respective rule elements is associated with that element, for generating rules corresponding to those statuses from information associated with that element, and step (C) includes the step of responding to existence of an entry in the rules base associated with the designated objective and circumstance, which entry has one or more statuses indicating that the respective rule elements should be sought elsewhere, for generating rules corresponding to those statuses from information associated with one or more entries that are associated with the designated objective and with a circumstance that is any of an immediate or prior ancestor of the designated circumstance.

62. A method according to claim 47 for validating designated information, comprising the step of comparing such designated information with the rule generated in any of steps (B) and (C).

63. A method according to claim 47, wherein step (A) includes the step of accessing a rules base storing information indicating a structure of the rules base, that information including whether each of one or more entries are any of (i) associated with a characteristic identifying a condition necessary to determine whether information associated with that entry or with another entry corresponds to the rule for the associated objective and circumstance, (ii) associated with a multipart objective, (iii) associated with a next objective candidate rule key for use in defining a subsequent objective for which a rule is to be determined, (iv) associated with any of multiple rules or statuses.

64. A digital data processor storage medium storing a rules base comprising

A. a plurality of entries, each associated with an objective and with a circumstance, at least one of which entries has a status indicating that information associated with the entry corresponds to the rule for that objective and circumstance, and at least another of which entries has a status indicating that the rule for that objective and circumstance should be sought elsewhere;

B. a structure that defines an ancestral relationship of circumstances.

65. A digital data processor storage medium storing a rules base according to claim 64, comprising multiple structures, each defining an ancestral relationship of circumstances for a respective set of one or more objectives.

66. A digital data processor storage medium storing a rules base according to claim 64, in which there may exist at least one entry which has a characteristic identifying a condition necessary to determine whether information associated with that entry or with another entry corresponds to the rule for the associated objective and circumstance.

67. A digital data processor storage medium storing a rules base according to claim 64, in which at least one entry has a multipart objective.

68. A digital data processor storage medium storing a rules base according to claim 64, in which at least one entry exists indicating that the associated objective and circumstance are invalid.

69. A digital data processor storage medium storing a rules base according to claim 64, in which at least one entry has multiple statuses and multiple corresponding rules for the objective and circumstance associated with that entry, each status indicating any of (i) that information corresponding to the respective rule is associated with the entry, and (ii) that the respective rule should be sought elsewhere.

* * * * *